(12) United States Patent
Maleki et al.

(10) Patent No.: US 11,778,554 B2
(45) Date of Patent: Oct. 3, 2023

(54) USER EQUIPMENT (UE) ANTENNA ADAPTATION FOR PUCCH TRANSMISSION

(71) Applicant: Telefonaktiebolaget LM Ericsson (publ), Stockholm (SE)

(72) Inventors: Sina Maleki, Malmö (SE); Joao Vieira, Hjärup (SE); Andres Reial, Höllviken (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/774,327

(22) PCT Filed: Nov. 21, 2019

(86) PCT No.: PCT/EP2019/082132
§ 371 (c)(1),
(2) Date: May 4, 2022

(87) PCT Pub. No.: WO2021/098965
PCT Pub. Date: May 27, 2021

(65) Prior Publication Data
US 2022/0394615 A1   Dec. 8, 2022

(51) Int. Cl.
*H04W 52/20* (2009.01)
*H04W 52/02* (2009.01)
(Continued)

(52) U.S. Cl.
CPC ...... *H04W 52/0225* (2013.01); *H04B 17/102* (2015.01); *H04B 17/309* (2015.01)

(58) Field of Classification Search
CPC .......... H04W 52/0225; H04B 17/102; H04B 17/309
See application file for complete search history.

(56) References Cited

U.S. PATENT DOCUMENTS 7,330,446 B2 * 2/2008 Lee .............. H04W 52/24
  370/318
9,892,752 B1 * 2/2018 Chu ................ G11B 5/5534
(Continued)

FOREIGN PATENT DOCUMENTS

EP   2625905 B1 * 4/2018 ............ H04W 52/16
WO  WO-2012047683 A1 * 4/2012 ............ H04W 52/16

OTHER PUBLICATIONS

"3GPP TS 33.401 V15.9.0", 3rd Generation Partnership Project; Technical Specification Group Services and System Aspects; 3GPP System Architecture Evolution (SAE); Security architecture (Release 15), Sep. 2019, pp. 1-163.
(Continued)

*Primary Examiner* — Hai V Nguyen
(74) *Attorney, Agent, or Firm* — Murphy, Bilak & Homiller, PLLC

(57) ABSTRACT

Embodiments include methods, performed by a user equipment (UE), for uplink (UL) transmission in a wireless network. Such methods include receiving a configuration associated with an UL transmission to a network node in the wireless network. Such methods include, for each of a plurality of combinations of the UE's available antennas and transmitters, determining metrics based on the UE performing the UL transmission using the particular combination. The metrics include a quality metric associated with reception of the UL transmission by the network node, and a UE energy consumption metric. Such methods include selecting one of the plurality of combinations of the available antennas and transmitters based on the respective quality metrics and the respective UE power consumption metrics, and performing the UL transmission according to the configuration and using the selected combination of available
(Continued)

antennas and transmitters. Other embodiments include UEs configured to perform such methods.

20 Claims, 10 Drawing Sheets

(51) Int. Cl.
*H04B 17/10* (2015.01)
*H04B 17/309* (2015.01)

(56) References Cited

U.S. PATENT DOCUMENTS

| | | | |
|---|---|---|---|
| 10,412,680 B1* | 9/2019 | Hou | H04W 52/241 |
| 2003/0058821 A1* | 3/2003 | Lee | H04W 52/24 |
| | | | 370/335 |
| 2012/0134441 A1 | 5/2012 | Yokomakura et al. | |
| 2017/0134148 A1 | 5/2017 | Yerramalli et al. | |
| 2017/0303278 A1* | 10/2017 | Calin | H04B 7/022 |
| 2019/0124626 A1 | 4/2019 | Bhattad et al. | |
| 2019/0281555 A1* | 9/2019 | Hou | H04W 52/0229 |
| 2019/0357150 A1* | 11/2019 | Wang | H04W 72/21 |

OTHER PUBLICATIONS

"3GPP TS 38.211 V15.6.0", 3rd Generation Partnership Project; Technical Specification Group Radio Access Network; NR; Physical channels and modulation (Release 15), Jun. 2019, pp. 1-97.
"3GPP TS 23.501 V16.2.0", 3rd Generation Partnership Project; Technical Specification Group Services and System Aspects; System Architecture for the 5G System (5GS); Stage 2 (Release 16), Sep. 2019, pp. 1-391.
"Adaptation aspects of NR UE power saving", 3GPP TSG-RAN WG1 Meeting #94bis; Tdoc R1-1811501; Chengdu, China, Oct. 8-12, 2018, pp. 1-4.
"Agreements up to RAN1#98bis on Multi-Beam1 (AI 7.2.8.3)", Oct. 29, 2019, pp. 1-9.
"Enhancements on multi-beam operations", 3GPP TSG RAN WG1 #99, R1-1912135, Reno, USA, Nov. 18-22, 2019, pp. 1-10.
"Enhancements to multi-beam operation", 3GPP TSG-RAN WG1 Meeting #97, Tdoc R1-1907436, Reno, USA, May 13-17, 2019, pp. 1-17.
"Power consumption reduction based on time/frequency/antenna adaptation", 3GPP TSG RAN WGI Meeting #94bis; R1-1810154; Chengdu, China, Oct. 8-12, 2018, pp. 1-5.

"Summary of agreements for NR_eMIMO up to RAN1#98", 3GPP TSG RAN WG1 98bis, R1-1911730, Chongqing, China, Oct. 14-18, 2019, 1 page.
"UE Adaptation to the Traffic and UE Power Consumption Characteristics", 3GPP TSG-RAN WG1 Meeting #94bis; R1-1811282; Chengdu, China, Oct. 8-12, 2018, pp. 1-17.
"UE-assisted Approaches for UE Power Saving", 3GPP TSG-RAN WGI Meeting #94bis; R1-1811128; Chengdu, China, Oct. 8-12, 2018, pp. 1-6.
"3GPP TS 38.401 V15.6.0", 3rd Generation Partnership Project; Technical Specification Group Radio Access Network; NG-RAN; Architecture description (Release 15), Jul. 2019, pp. 1-46.
"3GPP TS 38.211 V15.2.0", 3rd Generation Partnership Project; Technical Specification Group Radio Access Network; NR; Physical channels and modulation (Release 15), Jun. 2018, pp. 1-96.
"3GPP TS 38.214 V15.2.0", 3rd Generation Partnership Project; Technical Specification Group Radio Access Network; NR; Physical layer procedures for data (Release 15), Jun. 2018, pp. 1-94.
"3GPP TS 38.214 V15.6.0", 3rd Generation Partnership Project; Technical Specification Group Radio Access Network; NR; Physical layer procedures for data (Release 15), Jun. 2019, pp. 1-105.
"3GPP TS 38.331 V15.2.1", 3rd Generation Partnership Project; Technical Specification Group Radio Access Network; NR; Radio Resource Control (RRC) protocol specification (Release 15), Jun. 2018, pp. 1-303.
"3GPP TS 38.331 V15.6.0", 3rd Generation Partnership Project; Technical Specification Group Radio Access Network; NR; Radio Resource Control (RRC) protocol specification (Release 15), Jun. 2019, pp. 1-519.
Dahlman, Erik, et al., "Physical-Layer Control Signaling", 5G NR: The Next Generation Wireless Access Technology, Academic Press, 2018, pp. 184-197.
"3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.
"3GPP TS 36.213 V15.7.0", 3rd Generation Partnership Project; Technical Specification Group Radio Access Network; Evolved Universal Terrestrial Radio Access (E-UTRA); Physical layer procedures (Release 15), Sep. 2019, pp. 1-551.
"Draft Agenda RAN1 94bis", 3GPP TSG RAN WG1 Meeting #94bis; R1-1810050; Chengdu, China, Oct. 8-12, 2018, pp. 1-8.
"New SID: Study on UE Power Saving in NR", 3GPP TSG RAN Meetings #80; RP-181463; La Jolla, USA, Jun. 11-14, 2018, pp. 1-5.

* cited by examiner

---PRIOR ART---

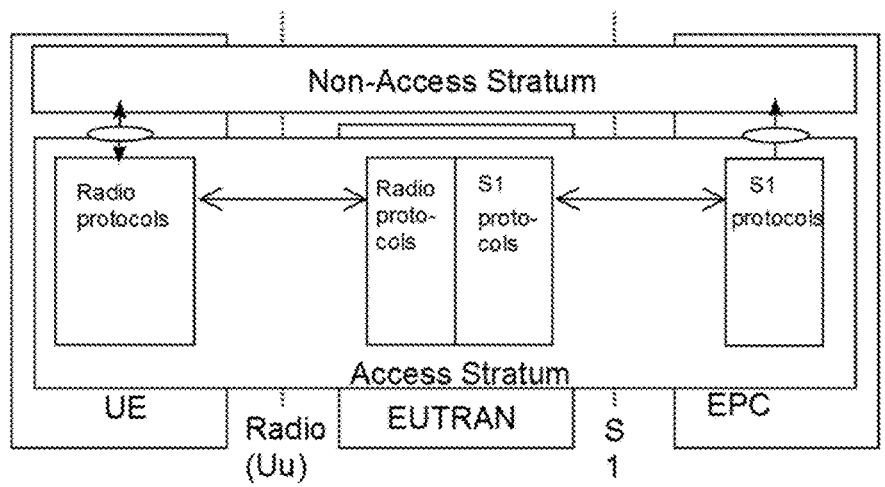
FIG. 2A ---PRIOR ART---
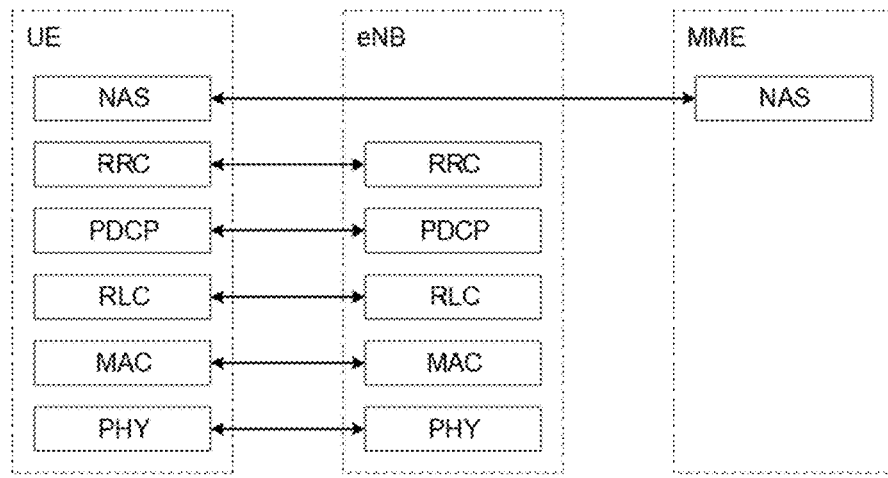
FIG. 2B ---PRIOR ART---
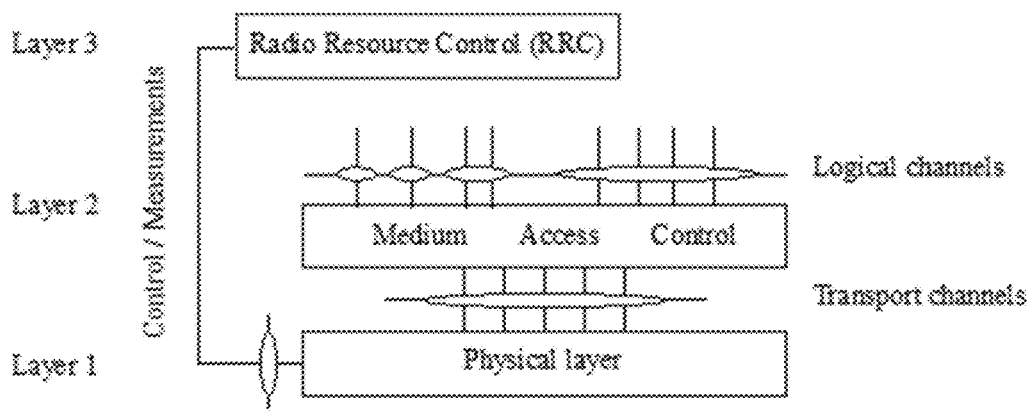
FIG. 2C ---PRIOR ART---

---PRIOR ART---

---PRIOR ART---

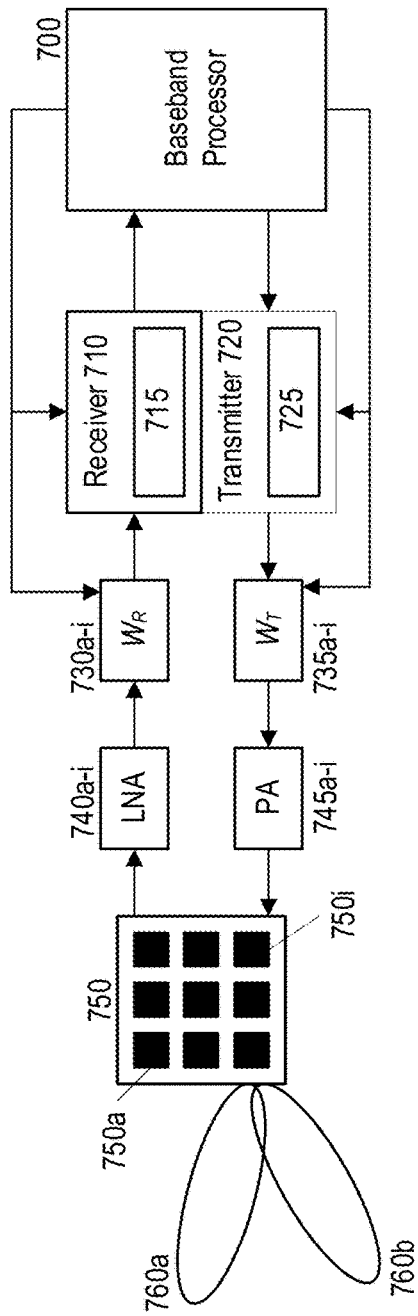
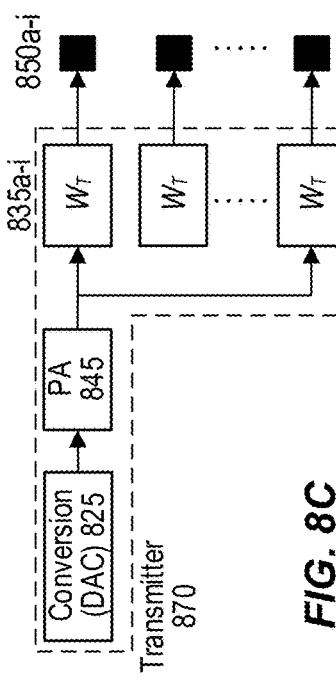
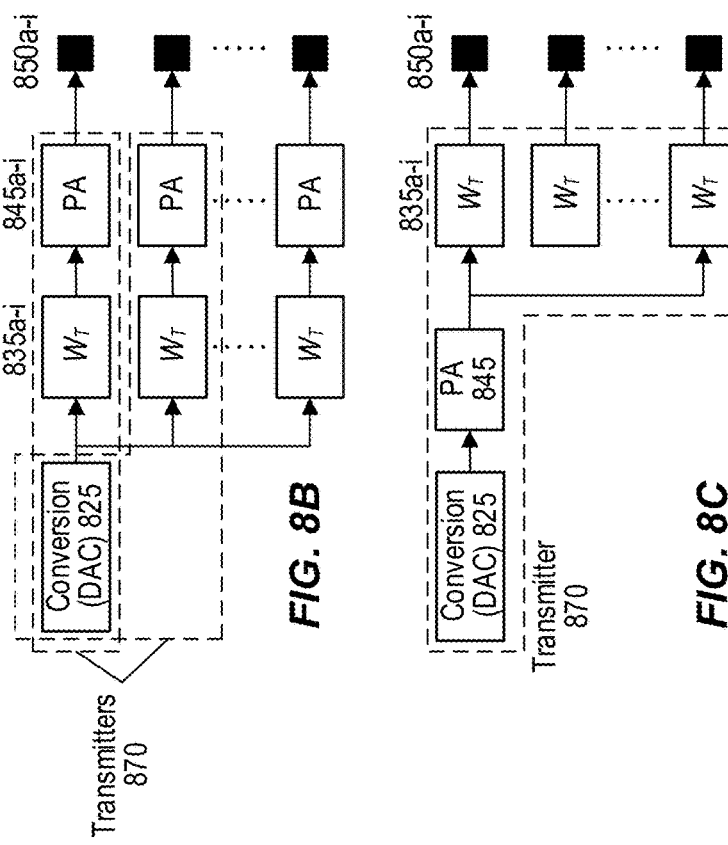
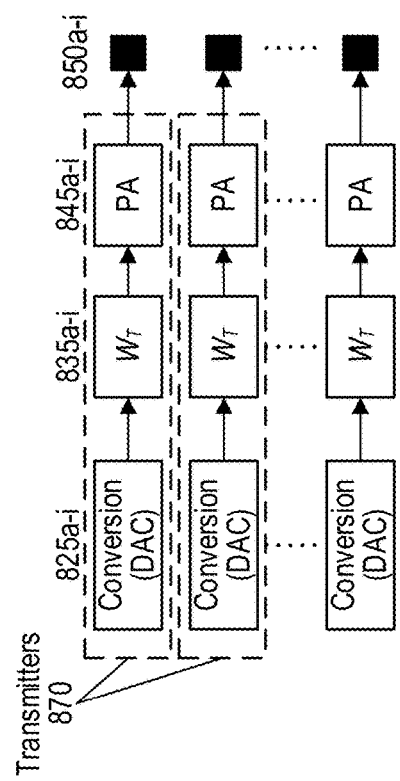
FIG. 7
FIG. 8A
FIG. 8B
FIG. 8C

Fig. 9A

```
950 — Determining that the UL transmission using the selected combination was unsuccessful.

960 — Selecting an updated combination, of the plurality of combinations, having an associated updated quality metric that is better than the quality metric associated with the selected combination.

970 — Performing the UL transmission using the updated combination.

980 — Determining updated quality metrics for each of the plurality of combinations of the available antennas and transmitters, including the selected combination.

985 — Based on the updated quality metric for the selected combination being worse than a second threshold, selecting an updated combination that includes a greater portion of the available antennas and transmitters than the selected combination.

990 — Based on the updated quality metric for the selected combination being better than a third threshold, selecting an updated combination that includes a lesser portion of the available antennas and transmitters than the selected combination.

995 — Based on the updated quality metric for the selected combination being better than a third threshold, selecting an updated combination that includes a lesser portion of the available antennas and transmitters than the selected combination.
```

FIG. 9B

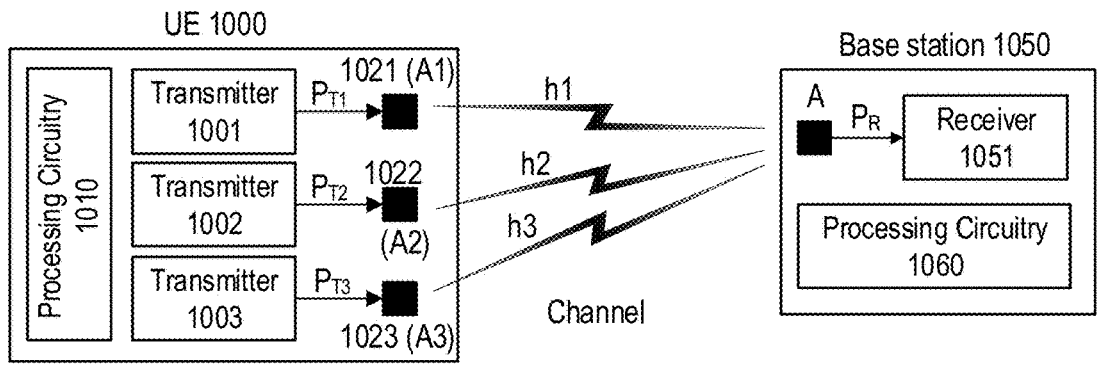

FIG. 10

USER EQUIPMENT (UE) ANTENNA ADAPTATION FOR PUCCH TRANSMISSION

TECHNICAL FIELD

The present invention generally relates to wireless communication networks, and particularly relates to improvements to user equipment (UE) energy consumption when operating in such networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long-Term Evolution (LTE is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within 3GPP specifications, "user equipment" (or "UE") can refer to any wireless communication device (e.g., smartphone or computing device) that is capable of communicating with 3GPP-standard-compliant network equipment, including E-UTRAN and earlier-generation RANs (e.g., UTRAN/"3G" and/or GERAN/"2G") as well as later-generation RANs in some cases.

As specified by 3GPP, E-UTRAN 100 is responsible for all radio-related functions in the network, including radio bearer control, radio admission control, radio mobility control, scheduling, and dynamic allocation of resources to UEs in uplink (UL) and downlink (DL), as well as security of the communications with the UE. These functions reside in the eNBs, such as eNBs 105, 110, and 115, which communicate with each other via an X1 interface. The eNBs also are responsible for the E-UTRAN interface to EPC 130, specifically the S1 interface to the Mobility Management Entity (MME) and the Serving Gateway (SGW), shown collectively as MME/S-GWs 134 and 138 in FIG. 1.

In general, the MME/S-GW handles both the overall control of the UE and data flow between UEs (such as UE 120) and the rest of the EPC. More specifically, the MME processes the signaling (e.g., control plane, CP) protocols between UEs and EPC 130, which are known as the Non-Access Stratum (NAS) protocols. The S-GW handles all Internet Protocol (IP) data packets (e.g., user plane, UP) between UEs and EPC 130, and serves as the local mobility anchor for the data bearers when a UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities— UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and 51 (E-UTRAN/EPC interface), each using a specific set of protocols, i.e., Radio Protocols and 51 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE UL PHY includes various reference signals including demodulation reference signals (DM-RS), which are transmitted to aid the eNB in the reception of an associated PUCCH or PUSCH; and sounding reference signals (SRS), which are not associated with any uplink channel.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $v_{VRB}$ corresponds to PRB $n_{PRB}=n_{VRB}$. On the other hand, distributed VRBs may be mapped to non-consecutive PRBs according to various rules, such as described in 3GPP TS 36.213. However, the term "PRB" shall be used in this disclosure to refer to both physical and virtual resource blocks. Moreover, the term "PRB" will be used herein to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries downlink control information (DCI) including scheduling assignments for PDSCH, grants for PUSCH and PUCCH, channel quality feedback (e.g., channel state information, CSI) for the UL channel, and other control information. DCI is typically transmitted in the first n OFDM symbols in each subframe, which is known as the control region. The number n (=1, 2, 3 or 4) is known as the Control Format Indicator (CFI) and is provided by the PCFICH transmitted in the first symbol of the control region.

Likewise, a PUCCH carries UL control information (UCI) such as scheduling requests (SR), CSI for the DL channel, HARQ feedback for PDSCH transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

Multi-antenna technology can be used to improve various aspects of a communication system, including system capacity (e.g., more users per unit bandwidth per unit area), coverage (e.g., larger area for given bandwidth and number of users), and increased per-user data rate (e.g., in a given bandwidth and area). Multi-antenna technology can also ensure better performance of wireless links as a mobile device experiences a time-varying channel.

While such improvements can be achieved using multiple antennas either at the UE or gNB, it also comes at the cost of additional energy consumption due to the need to activate additional radio-frequency transmitter and/or receiver circuitry (also referred to as "RF chains") and potentially additional digital processing. As such, there is a trade-off between improving communication quality and energy consumption. In some applications, for a given minimum required communication quality (e.g., as measured by some metric in the receiver), it is desirable to use no more energy than necessary in the transmitter and/or receiver. This is particularly important for UE transmitters, since UEs often have a finite supply of stored energy (e.g., in a battery) and a transmitter can consume significant portion of the stored energy. Accordingly, there is need for techniques that allow a UE to adapt its transmit (TX) antennas and TX RF chains reduce and/or minimize energy consumption while maintaining a minimum and/or desired quality of reception at base station receiver.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include method (e.g., procedure) for uplink (UL) transmission in a wireless network. These exemplary methods can be performed by a user equipment (UE, e.g., wireless device, IoT device, modem, etc. or component thereof) in communication with a network node (e.g., base station, gNB, en-gNB, etc., or component thereof) in the wireless network (e.g., NG-RAN, E-UTRAN).

These exemplary methods can include receiving a configuration associated with an UL transmission to a network node in the wireless network. For example, the UE can receive the configuration from the network node that provides the UE's current serving cell. The configuration can include any of the following to be used for the UL transmission: specific time/frequency resources, specific format, specific number of bits or symbols, etc. In some embodiments, the configuration can be for a single-layer UL transmission, even if the UE is capable of multi-layer transmission via a plurality of available antennas and transmissions. For example, the configuration can be for a single-layer PUCCH transmission or a single-layer PUSCH transmission.

In various embodiments, the UE can have a plurality of antennas and one or more transmitters. In some embodiments, the available antennas and transmitters can include a plurality of antennas and one transmitter that includes a power amplifier (PA) and a digital-to-analog converter (DAC). In other embodiments, the available antennas and transmitters can include a plurality of antennas and a corresponding plurality of transmitters that include respective PAs and respective DACs. In other embodiments, the available antennas and transmitters can include a plurality of antennas and a corresponding plurality of transmitters that include respective PAs and a common DAC.

These exemplary methods can also include, for each of a plurality of combinations of the UE's available antennas and transmitters, determining a plurality of metrics based on the UE performing the UL transmission using the particular combination. In other words, the UE determines the metrics for each particular combination based on assuming that the UE uses the particular combination for the UL transmission. The metrics can include a UE energy consumption metric and a quality associated with reception of the UL transmission by the network node.

In various embodiments, the quality metric for each combination can be based on one or more of the following: UE radiated power, network node received power, network node received signal-to-interference-and-noise ratio (SINR), and network node received block error rate (BLER).

In some embodiments, determining the quality metrics can include determining an UL channel vector in relation to the available antennas based on one or more of the following: measuring DL reference signals using the available antennas; and receiving, from the network node, CSI feedback related to an UL channel. In some of these embodiments, determining the quality metrics can also include determining the quality metric for each particular combination based on values of the UL channel vector associated with the available antennas comprising the particular combination, and transmit power radiated by the available antennas comprising the particular combination.

In other of these embodiments, when the UE has measured DL reference signals, determining the quality metrics can also include determining optimal receive beamforming weights for the available antennas comprising the particular combination based on the measured DL reference signals. In such embodiments, the UE can determine the quality metric for the particular combination based on the determined optimal receive beamforming weights and transmit power radiated by the available antennas comprising the particular combination.

In some embodiments, the UE power consumption metric associated with each particular combination of available antennas and transmitters can be based on an estimated antenna radiated power and/or an estimated transmitter operating power.

These exemplary methods can also include selecting one of the plurality of combinations of the available antennas and transmitters based on the respective quality metrics and the respective UE power consumption metrics. In some embodiments, the selected combination can comprise a single antenna and a single transmitter. These selections can be performed in various ways according to various embodiments.

In some embodiments, the selecting operations can include select one or more first combinations, of the plurality of combinations, having respective quality metrics better than a first threshold. In addition, the selecting operations can also include selecting, from the first combinations, the combination having the lowest UE power consumption metric. In some of these embodiments, the selecting operations can also include, if a plurality of the first combinations have the same lowest UE power consumption, selecting, from the plurality of first combinations, the combination having the best quality metric.

In other embodiments, the selecting operations can include selecting one or more first combinations, of the plurality, having respective UE power consumption metrics lower than a first threshold, and selecting, from the first combinations, the combination having the best quality metric.

In some embodiments, the selecting operations can be based on a look-up table (or "codebook") that includes a plurality of optimal combinations of available antennas and transmitters. Each optimal combination can be associated with one or more quality metrics and a UE power consumption metric. In some embodiments, each optimal combination can also be associated with one or more channel conditions, beamforming capabilities, transmit power levels per antenna, etc.

These exemplary methods can also include performing the UL transmission according to the configuration and using the selected combination of available antennas and transmitters.

In some embodiments, these exemplary methods can also include determining that the UL transmission using the selected combination was unsuccessful and selecting an updated combination, of the plurality of combinations, having an associated updated quality metric that is better than the quality metric associated with the selected combination. Such embodiments can also include performing the UL transmission using the updated combination.

In some embodiments, these exemplary methods can also include determining updated quality metrics for each of the plurality of combinations of the available antennas and transmitters, including the selected combination. Such embodiments can also include one or more of the following operations:
- based on the updated quality metric for the selected combination being worse than a second threshold, selecting an updated combination that includes a greater portion (e.g., more) of the available antennas and transmitters than the selected combination.
- based on the updated quality metric for the selected combination being better than a third threshold, selecting an updated combination that includes a lesser portion (e.g., fewer) of the available antennas and transmitters than the selected combination; and
- based on the updated quality metric for the selected combination being better than the second threshold and worse than the third threshold, maintaining the selected combination as the updated combination.

Other embodiments include user equipment (UEs, e.g., wireless devices, IoT devices, etc. or components thereof) configured to perform operations corresponding to any of the exemplary methods described herein. Other embodiments include non-transitory, computer-readable media storing program instructions that, when executed by processing circuitry, configure such UEs to perform operations corresponding to any of the exemplary methods described herein.

These and other objects, features, and advantages of the embodiments of the present disclosure will become apparent upon reading the following Detailed Description in view of the Drawings briefly described below.

BRIEF DESCRIPTION OF THE DRAWINGS

FIG. 2A is a high-level block diagram of an exemplary E-UTRAN architecture in terms of its constituent components, protocols, and interfaces.

FIG. 2B is a block diagram of exemplary protocol layers of the control-plane portion of the radio (Uu) interface between a user equipment (UE) and the E-UTRAN.

FIG. 2C is a block diagram of an exemplary LTE radio interface protocol architecture from the perspective of the physical (PHY) layer.

FIG. 7 shows a block diagram of an exemplary transceiver apparatus and/or device according to various exemplary embodiments of the present disclosure.

FIG. 8, which includes FIGS. 8A-8C, shows three exemplary arrangements of transmitters and antennas in the apparatus shown in FIG. 7, according to various exemplary embodiments of the present disclosure.

FIG. 9, which includes FIGS. 9A and 9B, shows a flow diagram of an exemplary method (e.g., procedure) performed by a user equipment (UE, e.g., wireless device, IoT device, etc.), according to various exemplary embodiments of the present disclosure.

FIG. 10 shows an exemplary arrangement of a UE configured for UL transmission over a wireless channel to a base station (e.g., eNB, gNB, etc.), according to various exemplary embodiments of the present disclosure.

DETAILED DESCRIPTION

Figure 1:
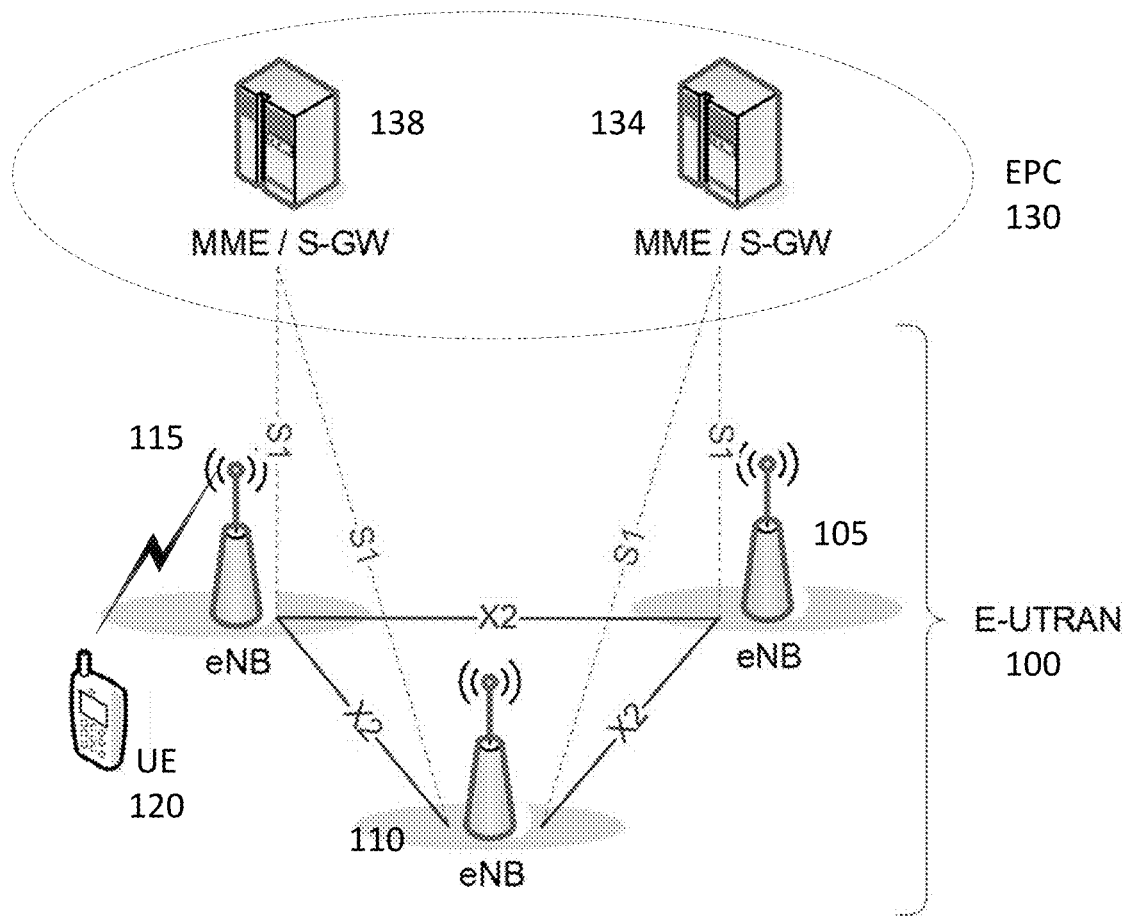
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 3A:
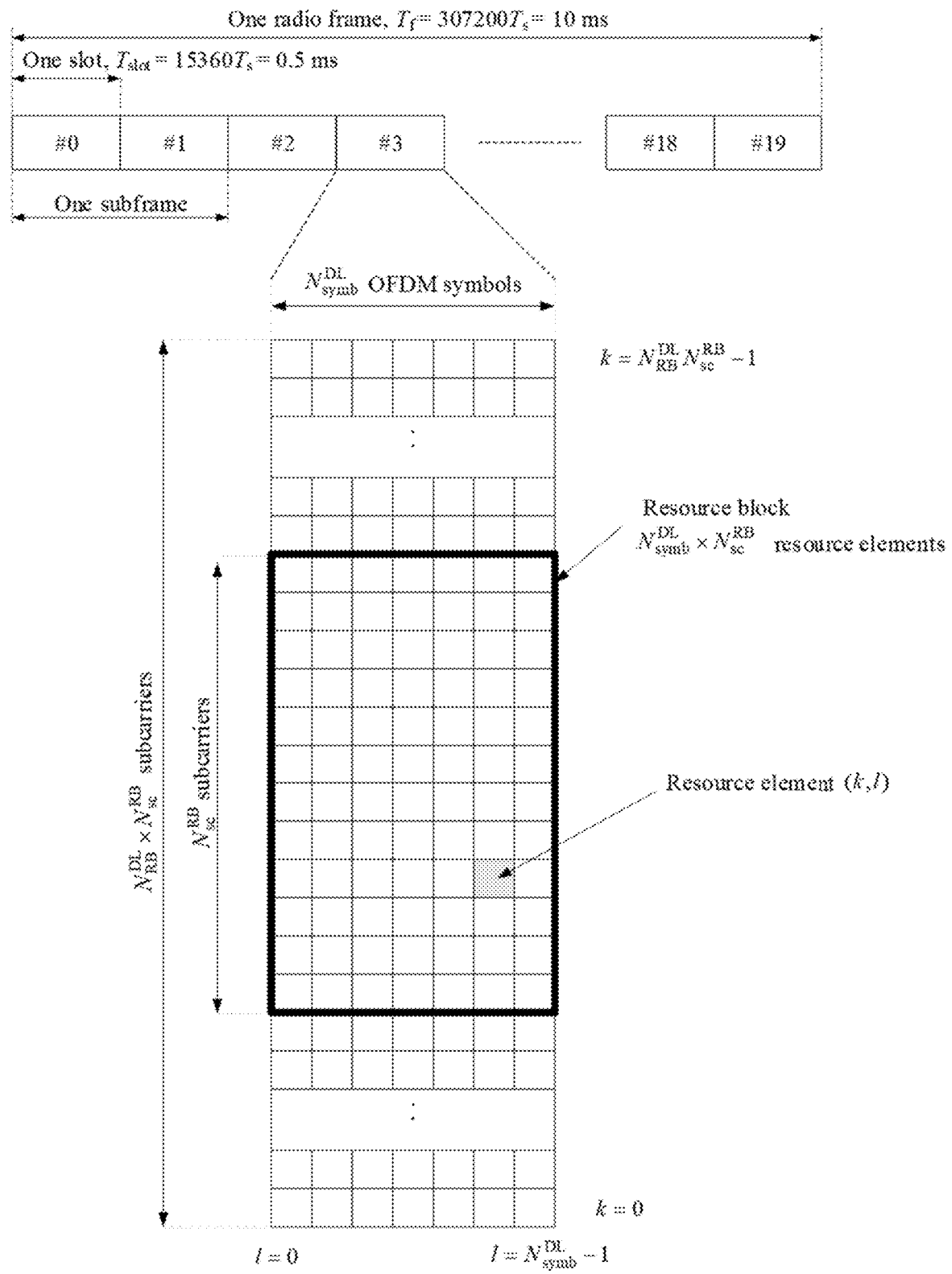
FIGS. 3A and 3B are block diagrams, respectively, of exemplary downlink and uplink LTE radio frame structures used for frequency division duplexing (FDD) operation.
Figure 3B:
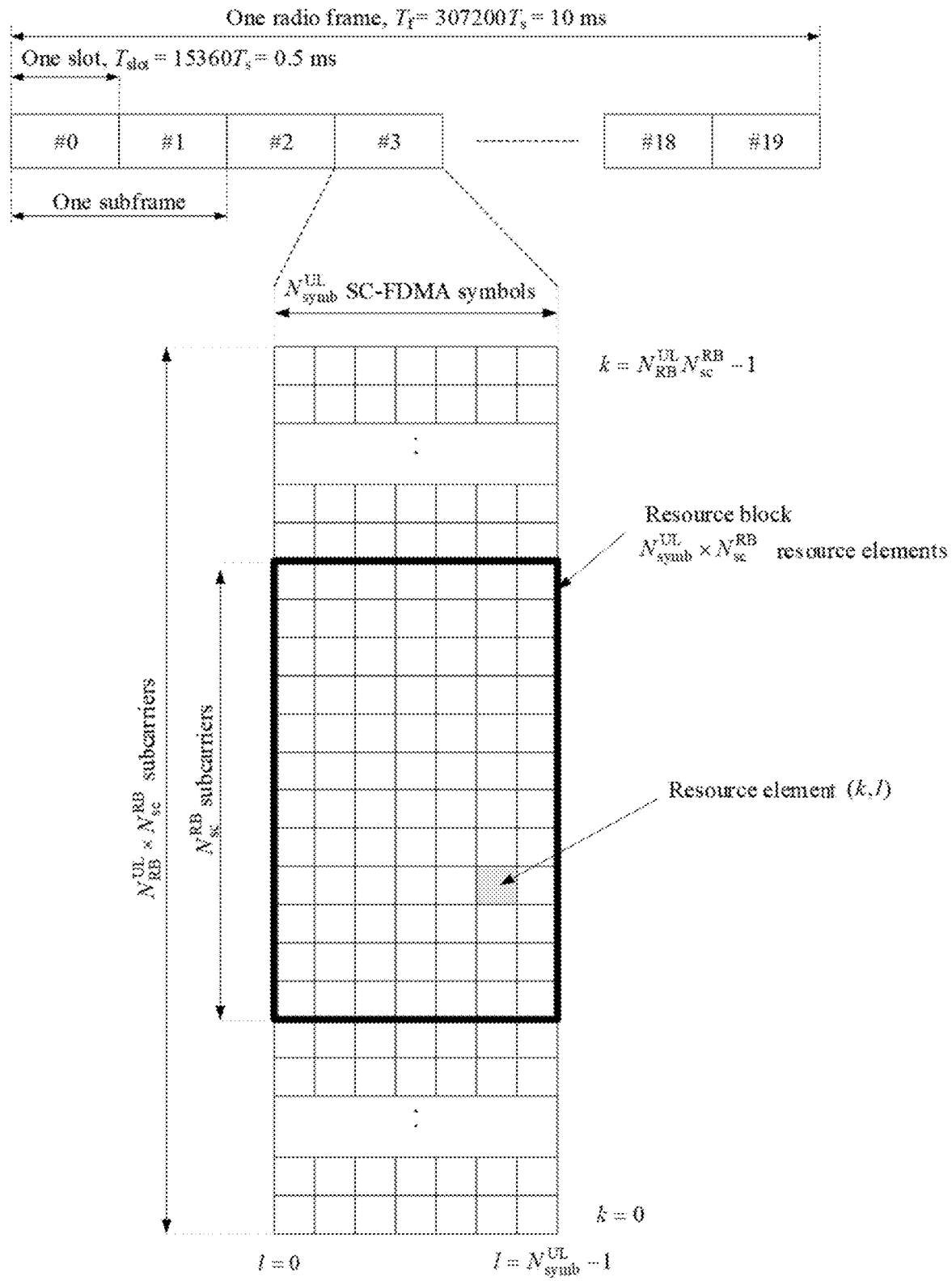

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, for a given minimum required communication quality (e.g., as measured by some metric in the receiver), it is desirable to use no more energy than necessary in the transmitter and/or receiver. This is particularly important for UE transmitters, since UEs often have a finite supply of stored energy (e.g., in a battery) and a transmitter can consume significant portion of the stored energy. Accordingly, there is need for techniques that allow a UE to adapt the number of transmit (TX) antennas and TX RF chains to reduce and/or minimize energy consumption while maintaining a minimum and/or desired quality of reception at base station receiver. This is discussed in more detail below.

While fourth-generation (4G, also known as "LTE") networks were primarily designed for user-to-user communications, 5G (also referred to as "NR") networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives.

For example, URLLC is intended to provide a data service with extremely strict error and latency requirements, e.g., error probabilities as low as $10^{-5}$ or lower and 1 ms end-to-end latency or lower. However, the peak data rate requirements are moderate. For eMBB, the latency and error probability requirements can be less stringent than URLLC, whereas the required peak rate and/or spectral efficiency can be higher than URLLC. In addition, NR is targeted to support deployment in lower-frequency spectrum similar to LTE, and in very-high-frequency spectrum (referred to as "millimeter wave" or "mmW").

Similar to LTE, NR uses orthogonal frequency division multiplexing (OFDM) in the downlink. Each NR radio frame is 10 ms in duration and is composed of 10 subframes having equal durations of 1 ms each. Each subframe consists of one or more slots, and each slot consists of 14 (for normal cyclic prefix) or 12 (for extended cyclic prefix) time-domain symbols.

Figure 4A:
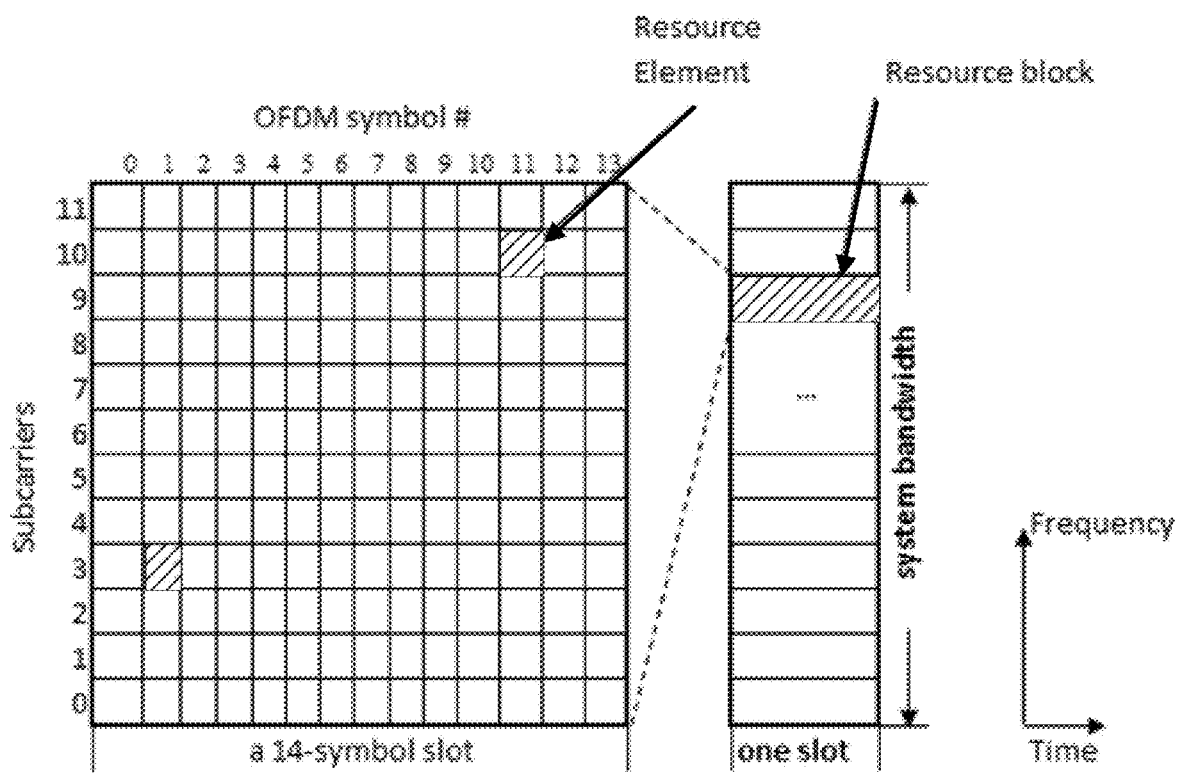
FIGS. 4A-4D illustrate various timeslot configurations used in the PHY layer of a 5G (or NR) network.

FIG. 4A shows an exemplary time-frequency resource grid for an NR slot. As illustrated in FIG. 4A, a resource block (RB) consists of 12 contiguous, or consecutive, sub-carriers in the frequency domain. In this example, the RB spans 14 symbols in the time domain for a duration of a 14-symbol slot, but in other examples may span a different number of symbols. Like in LTE, a resource element (RE)

consists of one subcarrier in the frequency domain and one symbol in the time domain. Common RBs (CRBs) are numbered from 0 to the end of the system bandwidth. Each carrier bandwidth part (BWP) configured for a UE has a common reference of CRB 0, such that a particular configured BWP may start at a CRB greater than zero. In this manner, a UE can be configured with a narrow BWP (e.g., 12 MHz) and a wide BWP (e.g., 120 MHz), each starting at a particular CRB, but only one BWP can be active for the UE at a given point in time.

Figure 4B:
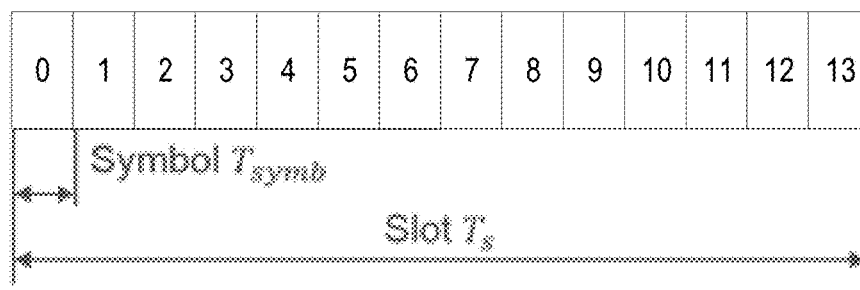
Figure 4C:
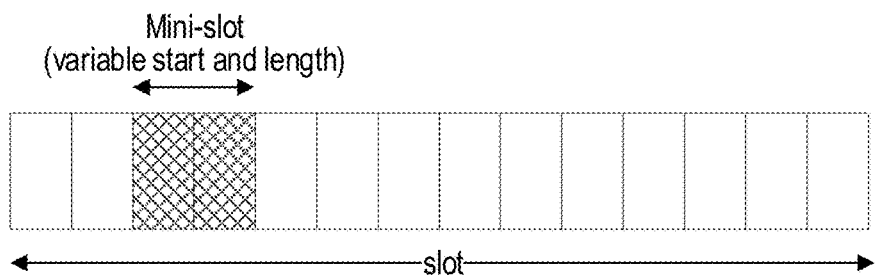

FIG. 4B shows an exemplary NR slot configuration comprising 14 symbols, where the slot and symbol durations are denoted $T_s$ and $T_{symb}$, respectively. The NR PHY also allows mini-slot transmissions. A mini-slot can include from one symbol up to one less than the number of symbols in a slot and can start at any symbol within a slot. FIG. 4C shows an exemplary mini-slot arrangement in which the mini-slot begins in the third symbol of the slot and is two symbols in duration.

Figure 4D:
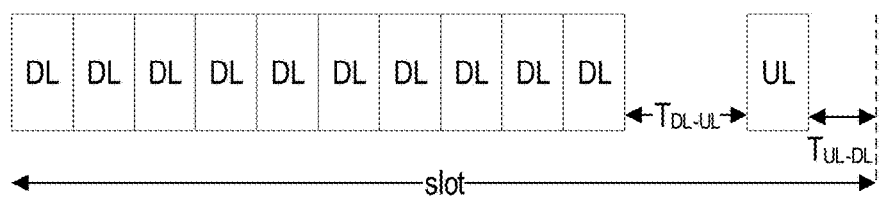

In certain time-division-duplexing (TDD) configurations, an NR slot can also be arranged with various combinations of UL and DL symbols. FIG. 4D shows an exemplary "DL-heavy" slot with one UL symbol. Moreover, this exemplary slot format includes guard periods before and after the UL symbol to facilitate change of transmission direction.

Similar to LTE, NR data scheduling is done on a per-slot basis. In each slot, the base station (e.g., gNB) transmits downlink control information (DCI) over PDCCH that indicates which UE is scheduled to receive data in that slot, which RBs will carry that data. A UE first detects and decodes DCI and, if successful, then decodes the corresponding PDSCH based on the decoded DCI. Likewise, DCI can include UL grants that indicate which UE is scheduled to transmit data in that slot, and which RBs will carry that data. A UE first detects and decodes an uplink grant from PDCCH and, if successful, then transmits the corresponding PUSCH on the resources indicated by the grant. DCI formats 0_0 and 0_1 are used to convey UL grants for PUSCH, while DCI formats 1_0 and 1_1 are used to convey PDSCH scheduling. Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple terminals, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

The payload together with the identifier-scrambled CRC is encoded and transmitted on the PDCCH. Each UE tries to detect a PDCCH with multiple hypothesis with respect to payload size and location in the time-frequency grid based on its configured search spaces. Once a UE decodes a DCI it de-scrambles the CRC with RNTI(s) that is(are) assigned to it and/or associated with the particular PDCCH search space. In case of a match, the UE considers the detected DCI addressed to itself and follows the instructions (e.g., scheduling information) contained in the DCI.

In LTE, PUCCH is transmitted in one or more PRBs at the edges of the system bandwidth, following a mirrored pattern with slot level frequency hopping within a subframe to maximize the frequency diversity. In NR, more flexible PUCCH structures are provided to support different applications and use cases, especially low-latency applications such as URLLC and high-reliability applications such as MTC. For example, multiple OFDM symbols can be allocated for long-duration NR PUCCH to ensure adequate coverage and robustness. Five different PUCCH formats (labelled 0-4) are provided with different durations (e.g., number of symbols), UCI bit capacities, and numbers of PRBs. These are illustrated in Table 1 below. NR PUCCH can also be frequency-multiplexed with PUSCH.

TABLE 1

| PUCCH Format | Type | Duration (symbols) | UCI bits | No. of PRBs |
|---|---|---|---|---|
| 0 | Short | 1-2 | 1 or 2 | 1 |
| 1 | Long | 4-14 | 1 or 2 | 1 |
| 2 | Short | 1-2 | >2 | 1-16 |
| 3 | Long | 4-14 | >2 | 1-6, 8-10, 12, 15-16 |
| 4 | Long | 4-14 | >2 | 1 |

Figure 5:
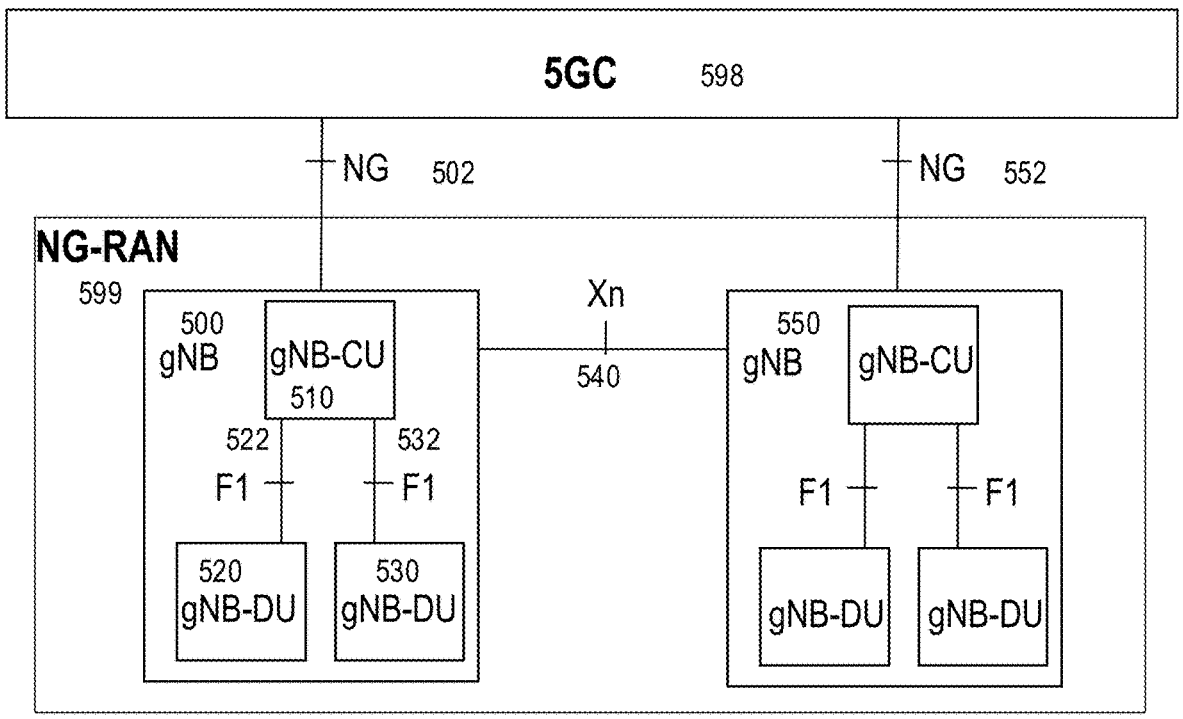
FIGS. 5-6 show two high-level views of an exemplary 5G network architecture.

FIG. 5 illustrates a high-level view of an exemplary 5G network architecture, including a Next Generation RAN (NG-RAN) 599 and a 5G Core (5GC) 598. NG-RAN 599 can include a set gNBs connected to the 5GC via one or more NG interfaces, such as gNBs 500, 550 connected via interfaces 502, 552, respectively. In addition, the gNBs can be connected to each other via one or more Xn interfaces, such as Xn interface 540 between gNBs 500 and 250.

NG-RAN 599 is layered into a Radio Network Layer (RNL) and a Transport Network Layer (TNL). The NG-RAN architecture (i.e., the NG-RAN logical nodes and interfaces between them) are parts of the RNL. For each NG-RAN interface (NG, Xn, F1) the related in TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on the TNL of NG-RAN interfaces is supported, NDS/IP (3GPP TS 33.401) can be applied.

The NG-RAN logical nodes shown in FIG. 5 (and described in 3GPP TS 38.401 and 3GPP TR 38.801) include a central (or centralized) unit (CU or gNB-CU) and one or more distributed (or decentralized) units (DU or gNB-DU). For example, gNB 500 includes gNB-CU 510 and gNB-DUs 520 and 530. CUs (e.g., gNB-CU 510) are logical nodes that host higher-layer protocols and perform various gNB functions such controlling the operation of DUs. Likewise, each DU is a logical node that hosts lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 522 and 532. The gNB-CU and connected gNB-DUs are only visible to other gNBs and 5GC 598 as a gNB. In other words, the F1 interface is generally not visible beyond a gNB-CU.

Figure 6:
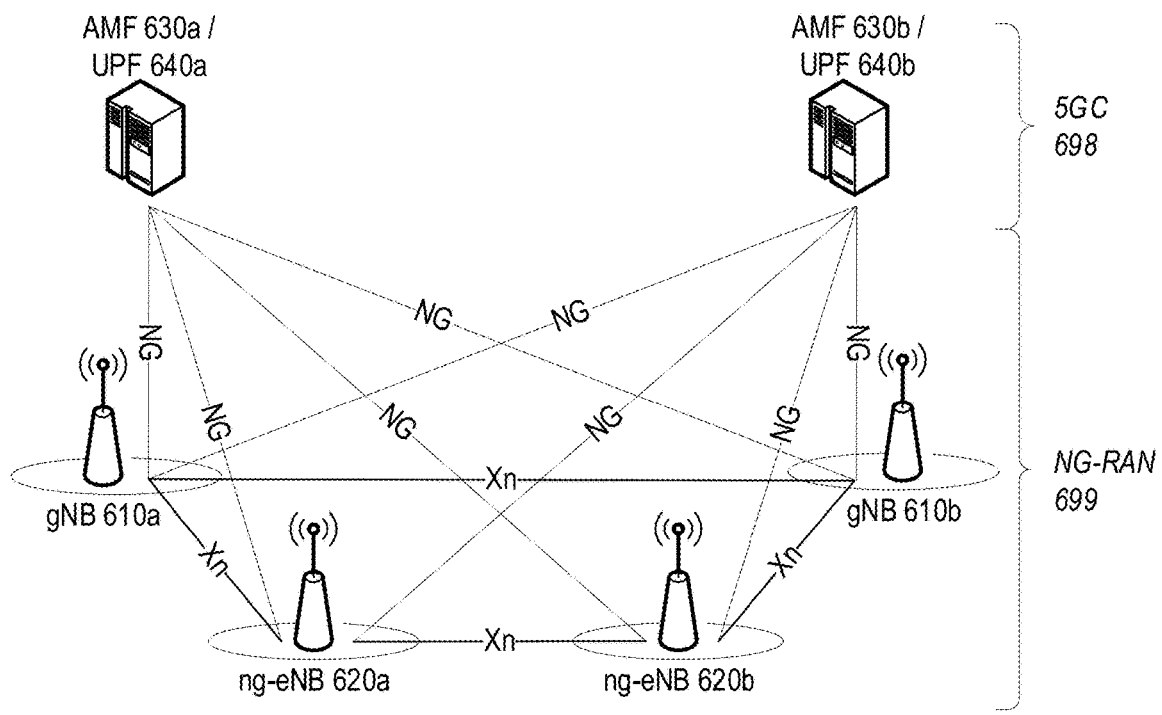

FIG. 6 shows another high-level view of an exemplary 5G network architecture, including NG-RAN 699 and 5GC 698. As shown in the figure, NG-RAN 699 can include gNBs 610 (e.g., 610a,b) and ng-eNBs 620 (e.g., 620a,b) that are interconnected with each other via respective Xn interfaces. The gNBs and ng-eNBs are also connected via the NG interfaces to 5GC 698, more specifically to the AMF (Access and Mobility Management Function) 630 (e.g., AMFs 630*a, b*) via respective NG-C interfaces and to the UPF (User Plane Function) 640 (e.g., UPFs 640*a,b*) via respective NG-U interfaces.

Each of the gNBs 610 can support the NR radio interface, including frequency division duplexing (FDD), time division duplexing (TDD), or a combination thereof. Each of ng-eNBs 620 supports the LTE radio interface and connects to the 5GC via the NG interface, whereas conventional LTE eNBs connect to an EPC via the X2 interface (as illustrated in FIG. 1).

Multi-antenna technology can be used to improve various aspects of a communication system such as 4G/LTE or 5G/NR, including system capacity (e.g., more users per unit bandwidth per unit area), coverage (e.g., larger area for given bandwidth and number of users), and increased per-user data rate (e.g., in a given bandwidth and area). Multi-antenna technology can also ensure better wireless links as a mobile or fixed device experiences a time-varying channel.

The availability of multiple antennas at the transmitter and/or the receiver can be utilized in different ways to achieve different goals. For example, multiple antennas at the transmitter and/or the receiver can be used to provide additional diversity against radio channel fading. To achieve such diversity, the channels experienced by the different antennas should have low mutual correlation, e.g., a sufficiently large antenna spacing ("spatial diversity") and/or different polarization directions ("polarization diversity"). Historically, the most common multi-antenna configuration has been the use of multiple antennas at the receiver side, which is commonly referred to as "receive diversity." Alternately and/or in addition, multiple antennas can be used in the transmitter to achieve transmit diversity. A multi-antenna transmitter can achieve diversity even without any knowledge of the channels between the transmitter and the receiver, so long as there is low mutual correlation between the channels of the different transmit antennas.

In other configurations, multiple antennas at the transmitter and/or the receiver can be used to shape or "form" the overall antenna beam (e.g., transmit and/or receive beam, respectively) in a certain way, with the general goal being to improve the received signal-to-interference-plus-noise ratio (SINR) and, ultimately, system capacity and/or coverage. This can be done, for example, by maximizing the overall antenna gain in the direction of the target receiver or transmitter or by suppressing specific dominant interfering signals. In general, beamforming can increase the signal strength at the receiver in proportion to the number of transmit antennas. Beamforming can be based either on high or low fading correlation between the antennas. High mutual antenna correlation can typically result from a small distance between antennas in an array. In such exemplary conditions, beamforming can boost the received signal strength but does not provide any diversity against radio-channel fading. On the other hand, low mutual antenna correlation typically can result from either a sufficiently large inter-antenna spacing or different polarization directions in the array. If some knowledge of the downlink channels of the different transmit antennas (e.g., the relative channel phases) is available at the transmitter, multiple transmit antennas with low mutual correlation can both provide diversity, and also shape the antenna beam in the direction of the target receiver and/or transmitter.

In other configurations, multiple antennas at both the transmitter and the receiver can further improve the SINR and/or achieve an additional diversity against fading compared to only multiple receive antennas or multiple transmit antennas. This can be useful in relatively poor channels that are limited, for example, by interference and/or noise (e.g., high user load or near cell edge). In relatively good channel conditions, however, the capacity of the channel becomes saturated such that further improving the SINR provides limited increases in capacity. In such cases, using multiple antennas at both the transmitter and the receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain conditions, the channel capacity can increase linearly with the number of antennas and avoid saturation in the data capacity and/or rates. These techniques are commonly referred to as "spatial multiplexing" or multiple-input, multiple-output (MIMO) antenna processing.

At a high level, MIMO operation can be described mathematically as follows. A symbol vector s carrying r information symbols is multiplied by an $N_T \times r$ precoder matrix W, which serves to distribute the transmit energy in a subspace of the $N_T$-dimensional vector space, corresponding to $N_T$ antenna elements. Each of the r symbols in s corresponds to a "layer," and r is referred to as the transmission "rank." In this way, spatial multiplexing is achieved since multiple symbols can be transmitted simultaneously over the same time/frequency resource element (TFRE). The number of symbols r is typically adapted to suit the current channel properties. To correctly receive an r-layer ("full rank") signal, a receiver must use at least r independent antenna elements.

Multi-antenna operation of a UE is further illustrated by FIG. 7, which shows a block diagram of an exemplary transceiver apparatus and/or device according to various exemplary embodiments of the present disclosure. For example, the exemplary transceiver apparatus can be a component of a UE, such as UEs described in relation to other figures.

The exemplary apparatus shown in FIG. 7 can include an antenna array 750 that can comprise a plurality of individual antenna elements arranged in a particular pattern. For example, exemplary antenna elements 750*a* to 750*i* can be arranged in an exemplary 3-by-3 grid. In some embodiments, antenna array 750 can be arranged as an M-by-N array of elements, where M≥1 and N>1. In some embodiments, the antenna elements 750*a* to 750*i* can be arranged in a rectangular grid with equal spacing in one or both dimensions; however, other exemplary arrangements of the elements comprising the array are possible and are within the scope of the present disclosure, including non-grid and/or irregular arrangements. In addition, each element of the antenna array 750 can have various physical forms including dipole, patch, cross dipole, inverted F, inverted L, helix, Yagi, rhombic, lens, and/or any another type of antenna topology known to persons of ordinary skill.

Elements 750*a* to 750*i* can utilize various polarization patterns known to persons of ordinary skill, including horizontal, vertical, circular, and cross polarization. For example, elements 750*a* to 750*i*—as well as their arrangement in the array 750—can be designed and/or configured especially for the particular operating frequency (e.g., 5 GHz, 10 GHz, 300 GHz, etc.) and device (e.g., mobile or fixed-location terminal, cellular phone, handset, laptop, tablet, etc.) in which the exemplary apparatus of FIG. 7 can be used.

According to certain exemplary embodiments of the present disclosure, the antenna elements 750a to 750i can be used for receiving and/or transmitting signals in combination with, respectively, other receiving and transmitting circuitry comprising the apparatus. The receiving circuitry can comprise a plurality of low-noise amplifiers (LNAs) 740a through 740i, each of which can amplify a signal received from a corresponding antenna element 750a through 750i. The exemplary apparatus can further comprise a plurality of receive gain/phase controls 730a through 730i (or "weights", labelled "$W_R$"), each of which can receive a signal output from a corresponding (LNAs) 740a through 740i. In some exemplary embodiments, the receive gain/phase control 730 can comprise a receiver beamformer that can be controlled by, e.g., one or more processors 700. The outputs of the receive gain/phase controls 730a through 730i are provided to a receiver block 710, which can comprise a receive conversion circuit 715. The inputs to block 710 can be at a particular radio frequency (RF), in which case block 710 can comprise circuitry configurable to translate the signals to an intermediate frequency (IF). Nevertheless, the skilled person can readily comprehend that RF-to-IF conversion can alternately occur prior to the signals reaching receiver block 710. As indicated herein, references to "processor" should be understood to mean one or more processors, including one or more computer processors, signal processors, etc.

The output of circuit 715 can include one or more streams of digitized samples that are provided to a baseband processor 700, which can provide one or more receiver control signals for controlling various operational aspects of, e.g., receive gain/phase controls 730a through 730i, receive conversion circuit 715, etc. Similarly, processor 700 can provide one or more streams of digitized samples to transmitter block 720, which can comprise a transmit conversion block 725. The output of block 720 (e.g., the output of transmit conversion block 725) can comprise a plurality of analog signals, each of which can be at RF or IF, as described above for the receiving circuitry. Each of the analog signals output by transmitter block 720 can be applied to a corresponding transmit gain/phase control 735a through 735i (or "weight", labelled "$W_T$"). Processor 700 can also provide one or more transmitter control signals for controlling various operational aspects of, e.g., transmit gain/phase controls 735a through 735i, transmit conversion block 725, etc. In some exemplary embodiments, transmit gain/phase control 735 can comprise a transmit beamformer that can be controlled by, e.g., processor 700. Each of the signals output by transmit gain/phase control 735a through 735i can be applied to a corresponding transmit power amplifier (PA) 745a through 745i. The amplified outputs of the PAs can be applied to respective corresponding antenna array elements 750a through 750i.

Although FIG. 7 shows a single transmit conversion block 725 combined with multiple transmit gain/phase controls 735a through 735i applied to corresponding transmit PAs 745a through 745i, this is merely one possible arrangement of transmit chains (also referred to as "transmitters") of the exemplary apparatus shown in FIG. 7. This is further illustrated by FIGS. 8A-8C, which show three other possible arrangements of the respective transmitters in the apparatus. More specifically, FIG. 8A shows an exemplary digital architecture in which antenna elements 850a-i are coupled with respective corresponding transmitters 870 (e.g., 870a-i), which consist of respective DACs 825a-i, transmit gain/phase controls 835a-i, and PAs 845a-i. In the arrangement of FIG. 8A, transmitters 870 can be generally independent such that they can be activated (e.g., powered on) or deactivated (e.g., powered off) individually as needed.

In contrast, FIG. 8B shows an exemplary analog architecture involving independent transmit gain/phase controls 835a-i and PAs 845a-i that are driven by a common DAC 825. Transmitters 870 are only partially independent in this case since the common DAC must remain powered on if any transmitter is active. FIG. 8C shows another exemplary analog architecture including a single DAC 825 that drives a single PA 845 whose output is applied to independent transmit gain/phase controls 835a-i to generate the transmit signals applied to respective antenna elements 850a-i. In this arrangement, both the common DAC and the common PA must be powered on if any of the transmit chains a-i are active.

Returning to FIG. 7, in some embodiments, processor 700 can utilize a direction-of-arrival estimate or other available information to determine appropriate weights (e.g., $W_R$ or $W_T$) to cause the antenna array 750 to produce one or more beam patterns directed to a particular angular direction relative to the antenna array. For example, by applying the appropriate weights (e.g., $W_R$ or $W_T$) to the signals received from the antenna elements 750a through 750i, the antenna array 750 can capture signals and/or multipath components that are incident in the directions of arrival corresponding to beams 760a and 760b while rejecting signals and/or multipath components that are incident other directions of arrival. In other exemplary embodiments, the weights can comprise and/or incorporate a precoder matrix that facilitates directing one or more beams directed to particular angular directions, e.g., for a beam sweep or to another device (e.g., base station) located at a specific position.

Processor 700 can program and/or configure receive gain/phase controls 730 and/or transmit gain/phase controls 735 with weights (e.g., $W_R$ or $W_T$, respectively) corresponding to the desired angular direction. Processor 700 can determine weights using various beam-steering or beam-forming algorithms know to persons of ordinary skill, including parametric algorithms and codebook-based algorithms. According to various exemplary embodiments, receive gain/phase controls 730 and/or transmit gain/phase controls 735 can comprise one or more programmable amplifiers that modifies the amplitude and/or phase of the signals (e.g., at RF or IF) from the array elements 750a through 750i. When no gain or phase adjustment of the signals to/from array elements 750a through 750i is required, the processor 700 can program the respective elements of controls 730 and/or 735 to unity gain and zero phase.

In further exemplary embodiments, processor 700 can comprise one or more general-purpose microprocessors, one or more special-purpose microprocessors, one or more digital signal processors (DSPs), one or more application specific integrated circuits (ASICs), and/or one or more other types of computer arrangement known to persons of ordinary skill in the art. Furthermore, processor 700 can be programmable and/or configured to perform the functions described herein by executable software code stored in an accessible memory or other type of computer-readable medium. In some exemplary embodiments, memory and/or other computer-readable medium (e.g., including RAM, ROM, memory stick, floppy drive, memory card, etc.) can be permanently programmed and/or configured with such executable software code, while in other exemplary embodiments, the memory or computer-readable medium can have the executable software code downloaded and/or configured.

More generally, skilled persons will recognize that various protocols and other functions of the exemplary device shown in FIG. 7 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware. For example, such various combinations can be utilized to execute various communication protocols specified by 3GPP and improvements described herein.

Various LTE and NR physical channels can be transmitted using multi-layer MIMO techniques discussed above. Even so, an NR UE always uses a single layer (i.e., rank 1) for transmitting PUCCH. However, if the UE is equipped with multiple TX antennas, such as shown in FIG. 7, it can apply transmit diversity. For PUCCH transmissions, a serving base station (e.g., NR gNB) schedules a UE with a specific time/frequency resources, modulation and coding scheme (MCS), etc. In addition, the gNB can determine the UE's PUCCH transmit power based on a closed-loop power control algorithm, or the gNB can allow the UE to choose its PUCCH transmit power according to an open-loop procedure based on path-loss compensation, as defined in 3GPP specifications. Nevertheless, the UE has the discretion to choose the number of antennas and TX chains it will used to transmit PUCCH.

Assuming that the UE is equipped with multiple TX chains, in a default case, the UE may have all transmit chains activated when transmitting PUCCH (e.g., for diversity gain). If UL channel conditions are favorable, however, this may not produce any noticeable improvement in the reception performance experienced by the PUCCH receiver at the base station (e.g., gNB), relative to the UE transmitting PUCCH using a fewer number of available transmit chains (e.g., one or two). Since each activated transmit chain increases UE energy consumption by some marginal amount, unnecessary use of excess transmit chains for PUCCH transmissions can reduce UE battery life and degrade user experience.

Even so, it is undesirable to reduce the number of transmit chains below the threshold needed to achieve acceptable PUCCH reception performance in view of the current UL channel conditions. For example, unacceptable PUCCH reception performance can result in the base station (e.g., gNB) failing to detect and/or decode important UCI, including UE scheduling requests, CSI for the DL channel, and HARQ feedback.

Exemplary embodiments of the present disclosure can address these and other issues, problems, and/or difficulties by providing a flexible mechanism for a UE to determine and/or select an appropriate number of antennas and transmit chains for PUCCH transmission that provide an expected PUCCH reception quality in the network while maintaining an acceptable, reduced, and/or optimal level of UE energy consumption. At a high level, the UE can select a plurality of combinations of available antennas and transmitters, evaluate a quality metric and a UE power consumption metric for each combination of the available antennas and transmitters, select one of the combinations based on the respective metrics (e.g., a combination that meets minimum reception quality requirement at lowest power consumption), and perform the PUCCH transmission using the selected combination. For example, the UE can determine the minimum number of available antennas and transmitters (or any other possible combination of available antennas and transmitters) leading to minimum UE power consumption for PUCCH transmission, subject to providing a sufficient quality of reception at the base station receiver (e.g., gNB).

In evaluating the quality metrics, the UE can consider various factors such as current UL channel conditions, UE transmit power level, number of UL bits, reliability of spatial information, etc. In general, it is assumed that the UE is aware of the UL channel conditions based on previous measurements/reports (e.g., measurement on CSI-RS), a previous UL grant for single-layer PUSCH transmission (e.g., MCS, code rate), transmit power assigned to the UE by the base station, UL beams chosen by the base station in response to UE sounding reference signal (SRS) transmission, etc.

Figure 9A:
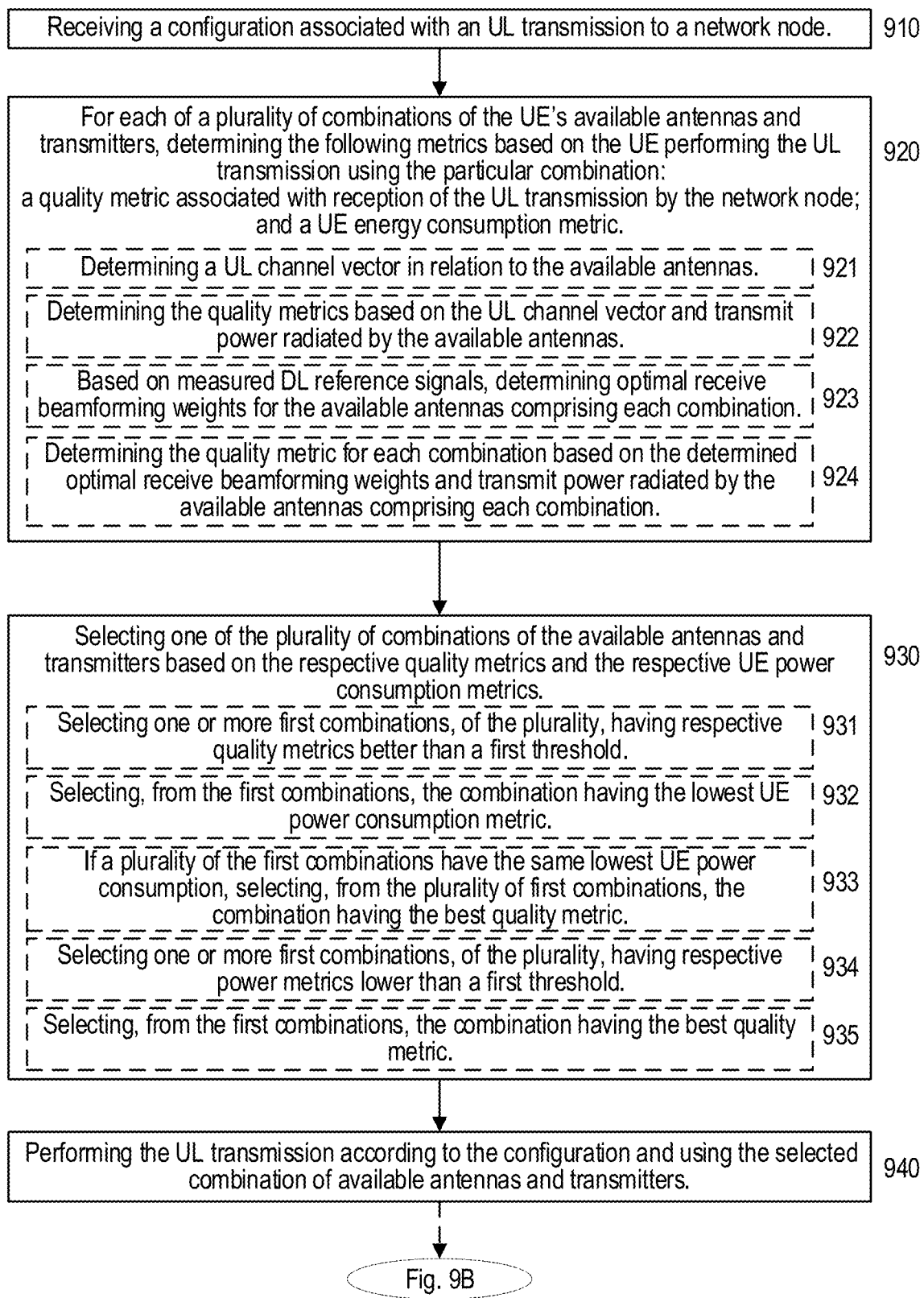

Various exemplary embodiments of the present disclosure can be illustrated by FIG. 9 (including FIGS. 9A and 9B), which shows an exemplary method (e.g., procedure) for uplink (UL) transmission in a wireless network (e.g., E-UTRAN, NG-RAN). The exemplary method shown in FIG. 9 can be performed by a user equipment (UE, e.g., wireless device, IoT device, modem, etc. or component thereof) in communication with a network node (e.g., base station, gNB, en-gNB, etc., or component thereof) in the wireless network. For example, the exemplary method shown in FIG. 9 can be implemented in a UE configured according to other figures herein. Although FIG. 190 shows specific blocks in a particular order, the operations of the exemplary method can be performed in a different order than shown and can be combined and/or divided into blocks having different functionality than shown. Optional blocks or operations are indicated by dashed lines.

The exemplary method can include the operations of block 910, in which the UE can receive a configuration associated with an UL transmission to a network node in the wireless network. For example, the UE can receive the configuration from the network node (e.g., gNB or eNB) that provides the UE's current serving cell in the wireless network (e.g., NG-RAN or E-UTRAN). The configuration can include any of the following to be used for the UL transmission: specific time/frequency resources, specific format (e.g., of PUCCH formats 0-4 in Table 1), specific number of bits or symbols, etc.

In some embodiments, the configuration can be for a single-layer UL transmission, even if the UE is capable of multi-layer transmission via a plurality of available antennas and transmissions. For example, the configuration can be for a single-layer PUCCH transmission or a single-layer PUSCH transmission.

The UE can have a plurality of antennas and one or more transmitters. In some embodiments, the available antennas and transmitters can include a plurality of antennas and one transmitter that includes a power amplifier (PA) and a digital-to-analog converter (DAC). This arrangement is exemplified by FIG. 8C. In other embodiments, the available antennas and transmitters can include a plurality of antennas and a corresponding plurality of transmitters that include respective PAs and respective DACs. This arrangement is exemplified by FIG. 8A. In other embodiments, the available antennas and transmitters can include a plurality of antennas and a corresponding plurality of transmitters that include respective PAs and a common DAC. This arrangement is exemplified by FIG. 8B.

The exemplary method can also include the operations of block 920, in which the UE can, for each of a plurality of combinations of the UE's available antennas and transmitters, determine a plurality of metrics based on the UE performing the UL transmission using the particular combination. In other words, the UE determines the metrics for each particular combination based on assuming that the UE uses the particular combination for the UL transmission. The metrics can include a UE energy consumption metric and a quality associated with reception of the UL transmission by the network node.

The combinations of antennas and transmitters can be further illustrated by reference to FIG. 10, which shows an exemplary arrangement of a UE 1000 configured for UL transmission over a wireless channel to a base station 1050 (e.g., eNB or gNB). In this arrangement, UE 1000 includes three transmitters 1001-1003, three antennas 1021-1023 (also labelled A1-A3, respectively), and processing circuitry 1010 (e.g., baseband circuitry), while base station 1050 includes a single antenna A and a receiver 1051.

For example, transmitters 1001-1003 can correspond to the transmitters shown in FIG. 8A. In the arrangement shown in FIG. 10, since each available antenna is coupled to a single available transmitter (e.g., 1021/A1 to 1001), combinations of available antennas implicitly identify the combinations of available antennas and transmitters. As such, the combinations of available antennas and transmitters can be identified by the set {A1, A2, A3, A1+A2, A2+A3, A1+A3, A1+A2+A3}, i.e., any single antenna and any combination of two or three antennas.

In various embodiments, the quality metric for each combination can be based on one or more of the following: UE radiated power, network node received power, network node received signal-to-interference-and-noise ratio (SINR), and network node received block error rate (BLER).

In embodiments where the quality metric is based on a network node parameter (e.g., received power, SINR, BLER, etc.), the UE requires knowledge (e.g., an estimate) of the wireless channel, either full or statistical. In the arrangement of FIG. 10, the channel estimate is represented by a channel vector, H=[h1, h2, h3], where hi is, in general, an estimate of the complex-valued channel response from UE antenna Ai to base station antenna A at a particular frequency (e.g., subcarrier) of interest. The energy response of such UL channels can be represented by vector [|h1|$^2$, |h2|$^2$, |h3|$^2$], where 1.1 denotes absolute value. In general, |hi|<1, meaning that the signal received by base station antenna is an attenuated version of the signal emitted from UE antenna Ai.

In some embodiments, the UE can also base the quality metric on the received SINR at the base station. The received SINR may not be readily available to the UE; however, the UE may be able to predict the received SINR at the gNB by estimating the received power (based on pathloss estimation, etc.) as well as predicting the noise power at the gNB. Predicting interference can be more difficult, since UE is not typically aware of the sources of the interference. Accordingly, the UE can add an estimated offset to account for interference in the channel.

In some embodiments, the quality metric can be chosen to be based on, or reflect, a metric defined by 3GPP standards, which may also define a threshold value for the standardized metric. In other cases, the UE may need to determine a threshold value for the quality metric. In general, the quality metric must be better than the threshold value to provide adequate PUCCH reception performance at the base station. The meaning of the term "better than" is metric-dependent. For some metrics, such as power and SINR, the quality metric must be greater than the threshold value to provide adequate PUCCH reception performance. For other metrics, such as BLER, the quality metric must be less than the threshold value to provide adequate PUCCH reception performance.

In determining the quality metric for a particular combination of available antennas and transmitters, the UE can also consider beamforming and/or spatial filters (e.g., $W_T$ in FIGS. 7-8) to be applied to the antennas of that particular combination. One such case is if the UE has up-to-date channel knowledge (e.g., of channel vector, H). This can be obtained, for example, based on UE measurements of DL reference signals and knowledge of reciprocity between UL and DL channels. Alternately, the UE can obtain up-to-date channel knowledge based on receiving CSI feedback from the network node in relation to an UL channel, e.g., PUSCH.

Accordingly, in some embodiments, determining the quality metrics in block 920 can include the operations of sub-block 921, in which the UE can determine an UL channel vector in relation to the available antennas based on one or more of the following: measuring DL reference signals using the available antennas; and receiving, from the network node, CSI feedback related to an UL channel.

In some embodiments, determining the quality metrics in block 920 can also include the operations of sub-block 922, in which the UE can determine the quality metric for each particular combination based on values of the UL channel vector (e.g., h1-h3 in FIG. 10) associated with the available antennas comprising the particular combination, and transmit power radiated by the available antennas comprising the particular combination (e.g., $P_{T1}$-$P_{T3}$ in FIG. 10).

In other embodiments, when the UE has measured DL reference signals in sub-block 921, determining the quality metrics in block 920 can also include the operations of sub-block 923-924. In sub-block 923, the UE can, based on the measured DL reference signals, determine optimal receive beamforming weights for the available antennas comprising the particular combination. In sub-block 924, the UE can determine the quality metric for the particular combination based on the determined optimal receive beamforming weights and transmit power radiated by the available antennas comprising the particular combination.

In some embodiments, the UE power consumption metric associated with each particular combination of available antennas and transmitters can be based on one or more of the following: an estimated antenna radiated power, and an estimated transmitter operating power. For example, the estimated transmitter operating power can be linear or slightly sublinear in relation to the number of antennas and transmitters comprising a combination. For example, in the digital architecture shown in FIG. 8A, the relationship may be approximately linear since each transmitter can be powered on/off independently of the others. On the other hand, the arrangement shown in FIG. 8B may have a sub-linear relationship due to the dependence between the transmitters based on the common conversion circuit.

The exemplary method can also include the operations of block 930, in which the UE can select one of the plurality of combinations of the available antennas and transmitters based on the respective quality metrics and the respective UE power consumption metrics. This can be performed in various ways according to various embodiments, as discussed in more detail below.

In some embodiments, the selected combination can comprise a single antenna and a single transmitter. As an example, the UE can first rank the combinations based on their respective quality metrics, then determine if the top-ranked combination (or alternatively a randomly-selected combination) having a single antenna can satisfy the minimum requirement. If not, then the UE can determine whether combinations comprising more antennas and transmitters can satisfy the requirements.

As another example, the UE can also determine if it can reduce the transmit power per antenna but use combinations with multiple antennas (i.e., each with the lower transmit power) to achieve beamforming gain. This can shape another antenna subset(s), As such the UE can shortlist a number of antenna subset combinations which satisfy the requirements.

In some embodiments, the selecting operations in block 930 can include the operations of sub-blocks 931-932. In sub-block 931, the UE can select one or more first combinations, of the plurality of combinations, having respective quality metrics better than a first threshold. As discussed above, the meaning of "better than" is dependent on the particular quality metric being used. In sub-block 932, the UE can select, from the first combinations, the combination having the lowest UE power consumption metric. In some of these embodiments, the selecting operations in block 930 can also include the operations of sub-block 933, in which the UE can, if a plurality of the first combinations have the same lowest UE power consumption, select, from the plurality of first combinations, the combination having the best quality metric. Similar to "better than", "best" can mean lowest or highest, depending on the particular quality metric being used. Furthermore, if the quality metric is a combination of multiple individual metrics (e.g., power and BLER), then "best" can mean the "best" combination according to some associated criterion or standard.

In other embodiments, the selecting operations in block 930 can include the operations of sub-blocks 934-935. In sub-block 934, the UE can select one or more first combinations, of the plurality, having respective UE power consumption metrics lower than a first threshold. In sub-block 935, the UE can select, from the first combinations, the combination having the best quality metric.

As another example, the UE can use the combination, and respective beamformer, of which the PUCCH grant was attributed to as a reference combination. Then, the UE can evaluate the feasibility of other combinations based on how their respective quality metrics relate to the quality metric of the reference combination. In the case the UE measures DL RSs and uses coherent reciprocity principles (discussed above in relation to sub-block 921), the evaluation can be aided by CSI-RSs with different receive antenna combinations, so that the UE estimates the quality metric of different multi-antenna subsets and their beamformers. This can correspond to the operations discussed above in relation to sub-blocks 923-924.

The selection operations in block 930 can be further illustrated by the following numerical examples, which are based on the exemplary arrangement shown in FIG. 10.

In a first example, the energy response of the channel is $[10^{-3}, 0.5*10^{-3}, 10^{-4}]$. As an example, this means that the channel attenuates the signal from UE antenna A1 to base station antenna A by 30 dB. Also, the UE is assumed to transmit with a total power of 10 mW (or 10 dBm) regardless of the number of active transmitters and antennas. In other words, Ptotal=$P_{T1}+P_{T2}+P_{T3}$=10 mW. The UE can perform maximum ratio transmission (MRT) if more than one antenna is activated in order to maximize the received power (or energy) of the signal at the base station. In addition to the 10 mW output power, each of the three UE transmitters 1001-1003 consumes 1 mW when powered on. As mentioned above, the combinations of available antennas and transmitters are identified by the set {A1, A2, A3, A1+A2, A2+A3, A1+A3, A1+A2+A3}, i.e., any single antenna and any combination of two or three antennas.

The quality metric used in this example is the received power (or energy) at the base station, which is generally proportional to the received SNR. The quality metric threshold is Preq=0.0105 mW=−19.7 dBm, meaning that the base station requires a received signal having this much power for adequate and/or acceptable PUCCH reception performance. For single-antenna combinations, the received power can be determined for antenna Ai based on:

$$P_R = |h_i|^2 \cdot P_{total} \qquad (1)$$

For two-antenna combinations using MRT, the received power can be determined for antennas Am and An (n≠m) based on:

$$P_R = (|h_n|^2 + |h_m|^2) \cdot P_{total}. \qquad (2)$$

Finally, for the three-antenna combination using MRT, the received power can be determined based on:

$$P_R = (|h_1|^2 + |h_2|^2 + |h_3|^2) \cdot P_{total}. \qquad (3)$$

Applying the exemplary values for H and Ptotal discussed above yields the following Table 2 of metrics for the respective combinations.

TABLE 2

| Combination | Quality metric | UE energy consumption metric |
|---|---|---|
| A1 | −20 dBm | 1 mW |
| A2 | −23 dBm | 1 mW |
| A3 | −30 dBm | 1 mW |
| A1 + A2 | −18.2 dBm | 2 mW |
| A1 + A3 | −19.6 dBm | 2 mW |
| A2 + A3 | −22.2 dBm | 2 mW |
| A1 + A2 + A3 | −18.0 dBm | 3 mW |

According to the above Table 2, none of the single-antenna combinations have a quality metric that is better than (i.e., greater than) the received power threshold Preq=−19.7 dBm. However, two-antenna combinations {A1,A2} and {A1,A3} and the three-antenna combination satisfy the minimum reception quality of −19.7 dBm. Since the UE energy consumption metric is greater for the three-antenna combination, the UE can select one of the two-antenna combinations to use for PUCCH transmission. For example, the UE could select {A1,A2} and their associated transmitters 1001-1002 because the quality metric of that combination is best among the group of two-antenna combinations that meet the received power threshold.

As a second example, assume that all parameters of the first example remain the same except that the base station reception quality threshold Preq=−26 dBm instead of −19.7 dBm used in the first example. Based on Table 2 above, both single-antenna combinations A1 and A2 are better than (i.e., greater than) reception quality threshold Preq=−26 dBm. Since the UE energy consumption metric is the same for both, the UE can select between the two based on another criterion, such as the combination with the better quality metric. In this case, the UE would select the combination of A1 and associated transmitter 1001.

In some embodiments, the selection operation in block 930 can be based on a look-up table (or "codebook") that includes a plurality of optimal combinations of available antennas and transmitters. Each optimal combination can be associated with one or more quality metrics and a UE power consumption metric. In some embodiments, each optimal combination can also be associated with one or more channel conditions (e.g., channel vectors), beamforming capabilities, transmit power level per antenna, etc. For example, the UE can build the look-up table based on previous selections among its combinations of available antennas and transmitters in scenarios involving different combinations of these factors and/or parameters. Subsequently, the UE can utilize the look-up table to quickly determine and/or select the combination that is optimal, in some sense, for conditions of its current UL transmission (e.g., PUCCH).

The exemplary method can also include the operations of block 940, where the UE can perform the UL transmission according to the configuration (e.g., received in block 910) and using the selected (e.g., in block 930) combination of available antennas and transmitters. In some embodiments, the UE can also monitor for occasions where the PUCCH transmission performed in this manner was not successfully decoded and/or received by the base station. Such occurrences can indicate that the selected combination may have become suboptimal, or that a combination with greater number of antennas and transmitters is needed to achieve adequate PUCCH performance at the base station.

The UE can become aware of unsuccessful PUCCH reception in different ways. For example, if the PUCCH transmission includes a SR and nothing is received in response, it could mean that the PUCCH is not received successfully. The same conclusion can be reached by the UE if the PUCCH transmission includes a HARQ NACK, but no retransmission is scheduled by the base station. In case the PUCCH transmission includes a CSI report and a HARQ ACK, the UE can still detect a non-successful PUCCH reception if the CSI indicates a change since the last CSI report but the UE does not see this change reflected in how the base station schedules and/or configures the UE for subsequent communication.

Some extent of failed PUCCH transmission may be acceptable. That extent may be limited to a rate that is significantly lower than the PUCCH BLER. If failures exceeding such a threshold are detected, the UE may select a different combination, adjust the quality metric threshold, deactivate the selected combination, etc.

Accordingly, in some embodiments, the exemplary method can include the operations of blocks 950-970. In block 950, the UE can determine that the UL transmission using the selected combination (e.g., in block 940) was unsuccessful. This can be done in any manner discussed above. In block 960, the UE can select an updated combination, of the plurality of combinations, having an associated updated quality metric that is better than the quality metric associated with the selected combination. In the context of the second example discussed above, if the UE determines that PUCCH transmission using only A1 was unsuccessful, it can select the combination {A1,A2} that has a quality metric better than the combination with only A1 (i.e., −18.2 vs. −19.6 dBm). In block 970, the UE can perform the UL transmission using the updated combination (e.g., A1+A2 and their associated transmitters 1001-1002 in FIG. 10).

The re-evaluation of the selected combination can be periodic or event-triggered. In the periodic case, the UE monitors the relevant performance metric at a given rate. The monitoring rate can also change over time and can be computed based on time varying statistics/aspects of the channel (e.g., measured Doppler spread, etc.).

Accordingly, in some embodiments, the exemplary method can include the operations of blocks 980-995. In block 980, the UE can determine updated quality metrics for each of the plurality of combinations of the available antennas and transmitters, including the selected combination. This can be performed in the same manner as discussed above with respect to block 920. In block 985, based on the updated quality metric for the selected combination (i.e., the combination selected in block 930) being worse than a second threshold, the UE can select an updated combination that includes a greater portion (e.g., more) of the available antennas and transmitters than the selected combination. In block 990, based on the updated quality metric for the selected combination being better than a third threshold, the UE can select an updated combination that includes a lesser portion (e.g., fewer) of the available antennas and transmitters than the selected combination. In block 995, based on the updated quality metric for the selected combination being better than the second threshold and worse than the third threshold, the UE can maintain the selected combination as the updated combination.

As a more concrete example of such embodiments, the UE can reevaluate the performance for the currently selected combination based on two performance thresholds, $\lambda_U$ and $\lambda_D$. If the result of the estimated performance of the currently selected combination is below $\lambda_D$, the UE can increase the size of the selected combination by m antennas, e.g., m=[1, 2, 5], and associated transmitters. On the other hand, if the result of the estimated performance is above $\lambda_U$, the UE can decrease the size of the selected antenna subset by m antennas, e.g., m=[1, 2, 5], and associated transmitters. Finally, if the result of the estimated performance is between $\lambda_D$ and $\lambda_U$ the UE can maintain the same number of currently selected antennas.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 11:
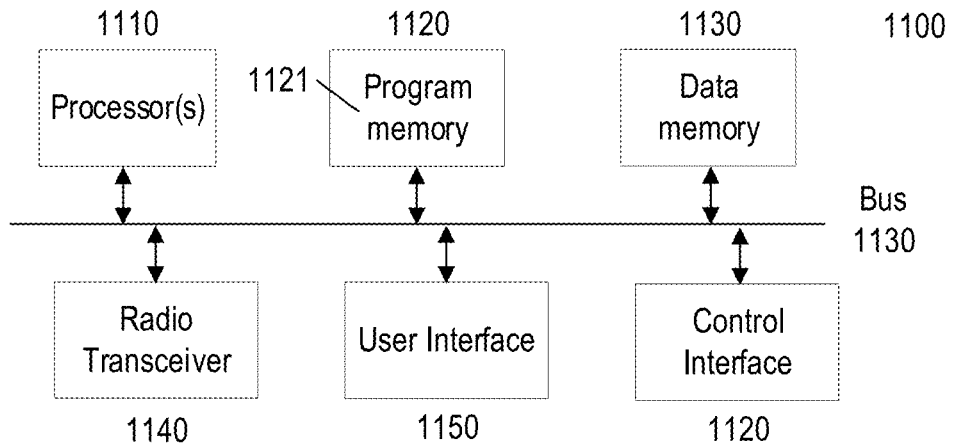
FIG. 11 is a block diagram of an exemplary wireless device or UE according to various exemplary embodiments of the present disclosure.

FIG. 11 shows a block diagram of an exemplary wireless device or user equipment (UE) 1100 (hereinafter referred to as "UE 1100") according to various embodiments of the present disclosure, including those described above with reference to other figures. For example, UE 1100 can be configured by execution of instructions, stored on a computer-readable medium, to perform operations corresponding to one or more of the exemplary methods and/or procedures described above.

UE 1100 can include a processor 1110 (also referred to as "processing circuitry") that can be operably connected to a program memory 1160 and/or a data memory 1170 via a bus 1170 that can comprise parallel address and data buses, serial ports, or other methods and/or structures known to those of ordinary skill in the art. Program memory 1160 can store software code, programs, and/or instructions (collectively shown as computer program product 1161 in FIG. 11) that, when executed by processor 1110, can configure and/or facilitate UE 1100 to perform various operations, including operations described below. For example, execution of such instructions can configure and/or facilitate UE 1100 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1140, user interface 1150, and/or control interface 1160.

As another example, processor 1110 can execute program code stored in program memory 1160 that corresponds to MAC, RLC, PDCP, and RRC layer protocols standardized by 3GPP (e.g., for NR and/or LTE). As a further example, processor 1110 can execute program code stored in program memory 1160 that, together with radio transceiver 1140, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1110 can execute program code stored in program memory 1160 that, together with radio transceiver 1140, implements device-to-device (D2D) communications with other compatible devices and/or UEs.

Program memory 1160 can also include software code executed by processor 1110 to control the functions of UE 1100, including configuring and controlling various components such as radio transceiver 1140, user interface 1150, and/or host interface 1160. Program memory 1160 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1160 can comprise an external storage arrangement (not shown) remote from UE 1100, from which the instructions can be downloaded into program memory 1160 located within or removably coupled to UE 1100, so as to enable execution of such instructions.

Data memory 1170 can include memory area for processor 1110 to store variables used in protocols, configuration, control, and other functions of UE 1100, including operations corresponding to, or comprising, any of the exemplary methods and/or procedures described herein. Moreover, program memory 1160 and/or data memory 1170 can include non-volatile memory (e.g., flash memory), volatile memory (e.g., static or dynamic RAM), or a combination thereof. Furthermore, data memory 1170 can comprise a memory slot by which removable memory cards in one or more formats (e.g., SD Card, Memory Stick, Compact Flash, etc.) can be inserted and removed.

Persons of ordinary skill will recognize that processor 1110 can include multiple individual processors (including, e.g., multi-core processors), each of which implements a portion of the functionality described above. In such cases, multiple individual processors can be commonly connected to program memory 1160 and data memory 1170 or individually connected to multiple individual program memories and or data memories. More generally, persons of ordinary skill in the art will recognize that various protocols and other functions of UE 1100 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1140 can include radio-frequency transmitter and/or receiver functionality that facilitates the UE 1100 to communicate with other equipment supporting like wireless communication standards and/or protocols. In some exemplary embodiments, the radio transceiver 1140 includes one or more transmitters and one or more receivers that enable UE 1100 to communicate according to various protocols and/or methods proposed for standardization by 3GPP and/or other standards bodies. For example, such functionality can operate cooperatively with processor 1110 to implement a PHY layer based on OFDM, OFDMA, and/or SC-FDMA technologies, such as described herein with respect to other figures.

In some exemplary embodiments, radio transceiver 1140 includes one or more transmitters and one or more receivers that can facilitate the UE 1100 to communicate with various LTE, LTE-Advanced (LTE-A), and/or NR networks according to standards promulgated by 3GPP. In some exemplary embodiments of the present disclosure, the radio transceiver 1140 includes circuitry, firmware, etc. necessary for the UE 1100 to communicate with various NR, NR-U, LTE, LTE-A, LTE-LAA, UMTS, and/or GSM/EDGE networks, also according to 3GPP standards. In some embodiments, radio transceiver 1140 can include circuitry supporting D2D communications between UE 1100 and other compatible devices.

In some embodiments, radio transceiver 1140 includes circuitry, firmware, etc. necessary for the UE 1100 to communicate with various CDMA2000 networks, according to 3GPP2 standards. In some embodiments, the radio transceiver 1140 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1140 can include a transceiver that is capable of wired communication, such as by using IEEE 802.3 Ethernet technology. The functionality particular to each of these embodiments can be coupled with and/or controlled by other circuitry in the UE 1100, such as the processor 1110 executing program code stored in program memory 1160 in conjunction with, and/or supported by, data memory 1170.

User interface 1150 can take various forms depending on the particular embodiment of UE 1100, or can be absent from UE 1100 entirely. In some embodiments, user interface 1150 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1100 can comprise a tablet computing device including a larger touchscreen display. In such embodiments, one or more of the mechanical features of the user interface 1150 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1100 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1100 having a touch screen display are capable of receiving user inputs, such as inputs related to exemplary methods and/or procedures described herein or otherwise known to persons of ordinary skill in the art.

In some embodiments, UE 1100 can include an orientation sensor, which can be used in various ways by features and functions of UE 1100. For example, the UE 1100 can use outputs of the orientation sensor to determine when a user has changed the physical orientation of the UE 1100's touch screen display. An indication signal from the orientation sensor can be available to any application program executing on the UE 1100, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1160 of the UE 1100 can take various forms depending on the particular exemplary embodiment of UE 1100 and of the particular interface requirements of other devices that the UE 1100 is intended to communicate with and/or control. For example, the control interface 1160 can comprise an RS-232 interface, an RS-4115 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1160 can comprise an IEEE 802.3 Ethernet interface such as described above. In some exemplary embodiments of the present disclosure, the control interface 1160 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1100 can comprise more functionality than is shown in FIG. 11 including, for example, a video and/or still-image camera, microphone, media player and/or recorder, etc. Moreover, radio transceiver 1140 can include circuitry necessary to communicate using additional radio-frequency communication standards including Bluetooth, GPS, and/or others. Moreover, the processor 1110 can execute software code stored in the program memory 1160 to control such additional functionality. For example, directional velocity and/or position estimates output from a GPS receiver can be available to any application program executing on the UE 1100, including various exemplary methods and/or computer-readable media according to various exemplary embodiments of the present disclosure.

Figure 12:
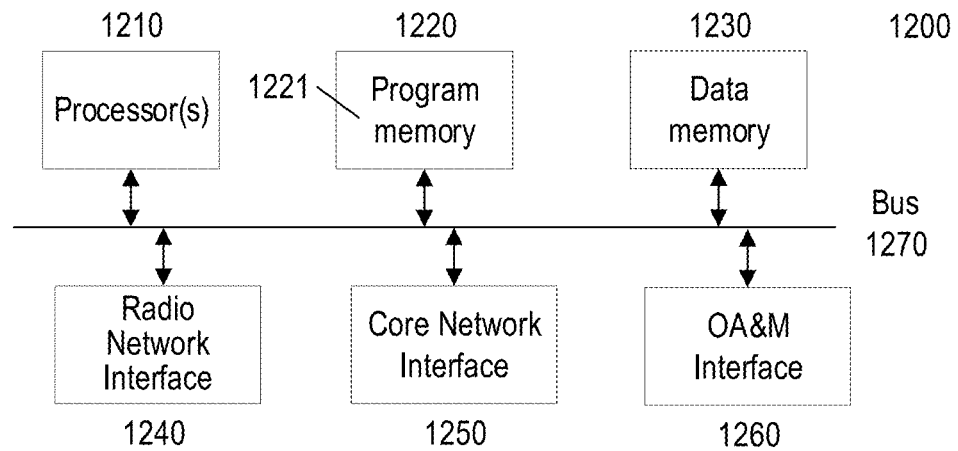
FIG. 12 is a block diagram of an exemplary network node according to various exemplary embodiments of the present disclosure.

FIG. 12 shows a block diagram of an exemplary network node 1200 according to various embodiments of the present disclosure, including those described above with reference to other figures. For example, exemplary network node 1200 can be configured by execution of instructions, stored on a computer-readable medium, to perform operations corresponding to one or more of the exemplary methods and/or procedures described above. In some exemplary embodiments, network node 1200 can comprise a base station, eNB, gNB, or one or more components thereof. For example, network node 1200 can be configured as a central unit (CU) and one or more distributed units (DUs) according to NR gNB architectures specified by 3GPP. More generally, the functionally of network node 1200 can be distributed across various physical devices and/or functional units, modules, etc.

Network node 1200 can include processor 1210 (also referred to as "processing circuitry") that is operably connected to program memory 1220 and data memory 1230 via bus 1270, which can include parallel address and data buses, serial ports, or other methods and/or structures known to those of ordinary skill in the art.

Program memory 1220 can store software code, programs, and/or instructions (collectively shown as computer program product 1221 in FIG. 12) that, when executed by processor 1210, can configure and/or facilitate network node 1200 to perform various operations. For example, execution of such stored instructions can configure network node 1200 to communicate with one or more other devices using protocols according to various embodiments of the present disclosure, including one or more exemplary methods and/or procedures discussed above. Program memory 1220 can also comprise software code executed by processor 1210 that can facilitate and specifically configure network node 1200 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1240 and core network interface 1250. By way of example and without limitation, core network interface 1250 can comprise the S1 interface and radio network interface 1240 can comprise the Uu interface, as standardized by 3GPP. Program memory 1220 can further comprise software code executed by processor 1210 to control the functions of network node 1200, including configuring and controlling various components such as radio network interface 1240 and core network interface 1250.

Data memory 1230 can comprise memory area for processor 1210 to store variables used in protocols, configuration, control, and other functions of network node 1200. As such, program memory 1220 and data memory 1230 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1210 can include multiple individual processors (not shown), each of which implements a portion of the functionality described above. In such case, multiple individual processors may be commonly connected to program memory 1220 and data memory 1230 or individually connected to multiple individual program memories and/or data memories. More generally, persons of ordinary skill will recognize that various protocols and other functions of network node 1200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1240 can comprise transmitters, receivers, signal processors, ASICs, antennas, beamforming units, and other circuitry that enables network node 1200 to communicate with other equipment such as, in some embodiments, a plurality of compatible user equipment (UE). In some embodiments, interface 1240 can also enable network node 1200 to communicate with compatible satellites of a satellite communication network. In some exemplary embodiments, radio network interface 1240 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1240. According to further exemplary embodiments of the present disclosure, the radio network interface 1240 can comprise a PHY layer based on OFDM, OFDMA, and/or SC-FDMA technologies. In some embodiments, the functionality of such a PHY layer can be provided cooperatively by radio network interface 1240 and processor 1210 (including program code in memory 1220).

Core network interface 1250 can comprise transmitters, receivers, and other circuitry that enables network node 1200 to communicate with other equipment in a core network such as, in some embodiments, circuit-switched (CS) and/or packet-switched Core (PS) networks. In some embodiments, core network interface 1250 can comprise the S1 interface standardized by 3GPP. In some embodiments, core network interface 1250 can comprise the NG interface standardized by 3GPP. In some exemplary embodiments, core network interface 1250 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1250 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1260 can comprise transmitters, receivers, and other circuitry that enables network node 1200 to communicate with external networks, computers, databases, and the like for purposes of operations, administration, and maintenance of network node 1200 or other network equipment operably connected thereto. Lower layers of OA&M interface 1260 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1240, core network interface 1250, and OA&M interface 1260 may be multiplexed together on a single physical interface, such as the examples listed above.

Figure 13:
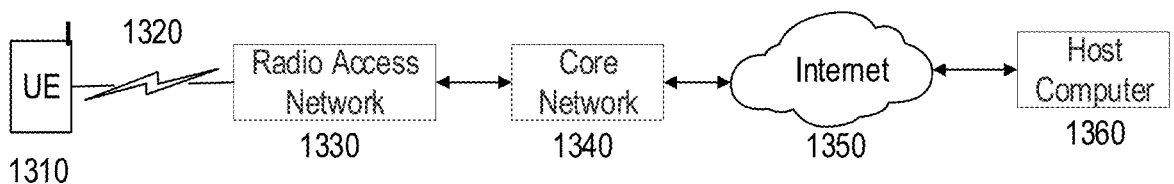
FIG. 13 is a block diagram of an exemplary network configured to provide over-the-top (OTT) data services between a host computer and a UE, according to various exemplary embodiments of the present disclosure.

FIG. 13 is a block diagram of an exemplary communication network configured to provide over-the-top (OTT) data services between a host computer and a user equipment (UE), according to one or more exemplary embodiments of the present disclosure. UE 1310 can communicate with radio access network (RAN) 1330 over radio interface 1320, which can be based on protocols described above including, e.g., LTE, LTE-A, and 5G/NR. For example, UE 1310 can be configured and/or arranged as shown in other figures discussed above.

RAN 1330 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1330 can cooperatively operate using licensed and unlicensed spectrum. In some embodiments, RAN 1330 can include, or be capable of communication with, one or more satellites comprising a satellite access network.

RAN 1330 can further communicate with core network 1340 according to various protocols and interfaces described above. For example, one or more apparatus (e.g., base stations, eNBs, gNBs, etc.) comprising RAN 1330 can communicate to core network 1340 via core network interface 1250 described above. In some exemplary embodiments, RAN 1330 and core network 1340 can be configured and/or arranged as shown in other figures discussed above. For example, eNBs comprising an E-UTRAN 1330 can communicate with an EPC core network 1340 via an S1 interface, such as shown in FIG. 1. As another example, gNBs comprising a NR RAN 1330 can communicate with a 5GC core network 1330 via an NG interface.

Core network 1340 can further communicate with an external packet data network, illustrated in FIG. 13 as Internet 1350, according to various protocols and interfaces known to persons of ordinary skill in the art. Many other devices and/or networks can also connect to and communicate via Internet 1350, such as exemplary host computer 1360. In some exemplary embodiments, host computer 1360 can communicate with UE 1310 using Internet 1350, core network 1340, and RAN 1330 as intermediaries. Host computer 1360 can be a server (e.g., an application server) under ownership and/or control of a service provider. Host computer 1360 can be operated by the OTT service provider or by another entity on the service provider's behalf.

For example, host computer 1360 can provide an over-the-top (OTT) packet data service to UE 1310 using facilities of core network 1340 and RAN 1330, which can be unaware of the routing of an outgoing/incoming communication to/from host computer 1360. Similarly, host computer 1360 can be unaware of routing of a transmission from the host computer to the UE, e.g., the routing of the transmission through RAN 1330. Various OTT services can be provided using the exemplary configuration shown in FIG. 13 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 13 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide flexible and efficient techniques for a UE to determine and/or select an appropriate number of antennas and transmitters for PUCCH that provide an expected PUCCH reception quality in the network while maintaining an acceptable, reduced, and/or optimal level of UE energy consumption. Such techniques can reduce excess energy consumption associated with PUCCH transmissions, which can result in the UE have more stored energy for other operations, such as OTT services. In addition, such techniques can increase the reliability of information sent on PUCCH, such as scheduling requests, HARQ feedback, etc., which can be associated with OTT services. When used in LTE or NR UEs (e.g., UE 1310) and eNBs or gNBs (e.g., gNBs comprising RAN 1330), exemplary embodiments described herein can provide various improvements, benefits, and/or advantages to OTT service providers and end-users, including more consistent data throughout and fewer delays without excessive UE power consumption, service interruptions, or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method performed by a user equipment (UE) configured for uplink (UL) transmission in a wireless network, the method comprising:
   receiving a configuration associated with an UL transmission to a network node in the wireless network;
   for each particular combination of a plurality of combinations of the UE's available antennas and transmitters, determining the following metrics based on the UE performing the UL transmission using the particular combination:
      a quality metric associated with reception of the UL transmission by the network node, and
      a UE energy consumption metric;
   selecting one of the plurality of combinations of the UE's available antennas and transmitters based on the respective quality metrics and based on the respective UE energy consumption metrics; and
   performing the UL transmission according to the configuration and using the selected combination of the UE's available antennas and transmitters.

2. The method of claim 1, wherein selecting one of the plurality of combinations comprises:
   selecting one or more first combinations, of the plurality, having respective quality metrics better than a first threshold; and
   selecting, from the first combinations, the combination having the lowest UE energy consumption metric.

3. The method of claim 2, wherein selecting one of the plurality of combinations further comprises, when a plurality of the first combinations have the lowest UE energy consumption metric, selecting the combination having the best quality metric from the plurality of first combinations having the lowest UE energy consumption metric.

4. The method of claim 1, wherein selecting one of the plurality of combinations comprises:
   selecting one or more first combinations, of the plurality, having respective UE energy consumption metrics lower than a first threshold; and
   selecting, from the first combinations, the combination having the best quality metric.

5. The method of claim 1, wherein determining the quality metrics comprises determining an UL channel vector in relation to the UE's available antennas based on one or more of the following:
   measuring downlink (DL) reference signals using the UE's available antennas; and
   receiving, from the network node, channel state information (CSI) feedback related to an UL channel.

6. The method of claim 5, wherein determining the quality metric for each particular combination is based on the following:
values of the UL channel vector associated with the available antennas comprising the particular combination; and
transmit power radiated by the available antennas comprising the particular combination.

7. The method of claim 5, wherein determining the quality metric for each particular combination further comprises:
based on the measured DL reference signals, determining optimal receive beamforming weights for the available UE antennas comprising the particular combination; and
determining the quality metric for the particular combination based on the determined optimal receive beamforming weights and transmit power radiated by the available UE antennas comprising the particular combination.

8. The method of claim 1, wherein determining the quality metric for each particular combination is based on one or more of the following:
UE radiated power;
network node received power;
network node received signal-to-interference-and-noise ratio (SINR); and
network node received block error rate (BLER).

9. The method of any of claim 1, wherein the selected combination is a single antenna and a single transmitter.

10. The method of claim 1, wherein determining the UE energy consumption metric for each particular combination is based on one or more of the following:
an estimated antenna radiated power, and
an estimated transmitter operating power.

11. The method of claim 1, wherein:
the UE's available antennas and transmitters include a plurality of antennas and one or more transmitters; and
the received configuration is for a single-layer UL transmission.

12. The method of claim 11, wherein the received configuration is for one of the following:
a physical uplink control channel (PUCCH) transmission; or
a physical uplink shared channel (PUSCH) transmission.

13. The method of claim 1, wherein the UE's available antennas and transmitters include one of the following:
a first arrangement comprising a plurality of antennas and one transmitter that includes a power amplifier (PA) and a digital-to-analog converter (DAC);
a second arrangement comprising a plurality of antennas and a corresponding plurality of transmitters that include respective PAs and respective DACs; or
a third arrangement comprising a plurality of antennas and a corresponding plurality of transmitters that include respective PAs and a common DAC.

14. The method of claim 1, further comprising:
determining that the UL transmission using the selected combination was unsuccessful;
selecting an updated combination, of the plurality of combinations, having an associated updated quality metric that is better than the quality metric associated with the selected combination; and
performing the UL transmission using the updated combination.

15. The method of claim 1, further comprising:
determining updated quality metrics for each of the plurality of combinations of the UE's available antennas and transmitters, including the selected combination;
based on the updated quality metric for the selected combination being worse than a second threshold, selecting an updated combination that includes a greater portion of the UE's available antennas and transmitters than the selected combination; and
based on the updated quality metric for the selected combination being better than a third threshold, selecting an updated combination that includes a lesser portion of the UE's available antennas and transmitters than the selected combination.

16. The method of claim 15, further comprising, based on the updated quality metric for the selected combination being better than the second threshold and worse than the third threshold, maintaining the selected combination as the updated combination.

17. The method of claim 1, wherein:
selecting the combination is based on a look-up table having a plurality of optimal combinations of the UE's available antennas and transmitters; and
each optimal combination is associated with one or more quality metrics and a UE energy consumption metric.

18. The method of claim 1, wherein at least a portion of the plurality of combinations of the UE's available antennas and transmitters are associated with respective beamforming configurations.

19. A user equipment (UE) configured for uplink (UL) transmission in a wireless network, the UE comprising:
transceiver circuitry including one or more transmitters and a plurality of antennas coupled to the one or more transmitters; and
processing circuitry operatively coupled to the transceiver circuitry, whereby the processing circuitry and the transceiver circuitry are configured to perform operations corresponding to the method of claim 1.

20. A non-transitory, computer-readable medium storing computer-executable instructions that, when executed by processing circuitry of a user equipment (UE) configured for uplink (UL) transmission in a wireless network, configure the UE to perform operations corresponding to the method of claim 1.

* * * * *